(12) United States Patent
Balog, Jr. et al.

(10) Patent No.: US 7,187,149 B1
(45) Date of Patent: Mar. 6, 2007

(54) COMMUTATION TECHNIQUE FOR AN AC-TO-AC CONVERTER BASED ON STATE MACHINE CONTROL

(75) Inventors: Robert S. Balog, Jr., Urbana, IL (US); Philip T. Krein, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 11/202,597

(22) Filed: Aug. 11, 2005

(51) Int. Cl.
*H02M 5/257* (2006.01)

(52) U.S. Cl. .................. 318/434; 388/903; 363/161

(58) Field of Classification Search ........ 318/376–381, 318/434; 388/903; 363/157, 159–165
See application file for complete search history.

(56) References Cited

U.S. PATENT DOCUMENTS

| | | | |
|---|---|---|---|
| 3,942,092 A * | 3/1976 | Bourbeau et al. ........... 363/162 |
| 4,792,741 A * | 12/1988 | Matsuo et al. .............. 318/800 |
| 5,151,853 A * | 9/1992 | Tatara et al. ................ 363/160 |
| 6,351,397 B1 * | 2/2002 | Sawa et al. .................... 363/50 |
| 6,771,524 B2 * | 8/2004 | Miguchi ...................... 363/149 |

* cited by examiner

*Primary Examiner*—Bentsu Ro
(74) *Attorney, Agent, or Firm*—Sonnenschein Nath & Rosenthal LLP

(57) ABSTRACT

A system for controlling a commutation of a load current is provided. The system comprises a AC-to-AC converter that includes a plurality of switching elements, an energy source that provides an oscillating voltage and is connected to the converter, an electrical load connected to the converter, and a controller that controls the converter, and monitors the oscillating voltage and the load current delivered to the electrical load. The controller determines a plurality of machine states of the converter, each of the plurality of machine states representing a corresponding conducting set of the plurality of switching elements, and controls switching between the plurality of machine states based on polarity commutations of the load current in the electrical load and polarity commutations of the oscillating voltage.

18 Claims, 19 Drawing Sheets

COMMUTATION TECHNIQUE FOR AN AC-TO-AC CONVERTER BASED ON STATE MACHINE CONTROL

FIELD OF THE INVENTION

The present application relates, in general, to converters and, more particularly, to a commutation technique for AC-to-AC converters based on state-machine control.

BACKGROUND OF THE INVENTION

AC-to-AC converters, such as cycloconverters and matrix converters, are used to transform AC voltage at one frequency into AC voltage at another frequency without the use of an intermediate DC link.

Cycloconverters have been in use since the 1920s, when mercury arc rectifiers were used in large industrial environments in variable-speed motor-drive applications. Generally, these early applications involved converting AC voltage at one frequency to AC voltage at a lower frequency. Recent applications are found in alternative energy systems and uninterruptible power supplies. There is a wealth of literature on the operation and control of these cycloconverters.

In the usual applications, such as industrial motor systems, a substantial inductive load (a motor) smoothes (filters) an output load current into a sinusoidal waveform, with ripple, that tracks a corresponding reference sinusoidal voltage with a phase lag. Commutating the load current between the switches of the cycloconverter has generally presented a significant challenge. The substantially inductive load requires a continuous current path, suggesting a make-before-break switching technique. However, the input voltage source requires that no short-circuit current paths exist, suggesting a break-before-make switching technique. As such, these early cycloconverters could not optimally manage this dichotomy; as a result, they suffered from poor efficiency and extremely poor input power factor and harmonic noise.

Commercial availability of the semiconductor thyristor in the 1960s led to a resurgence of popularity and renewed research on the cycloconverter. The thyristor provided lower power losses compared to mercury-arc rectification devices, and thus allowed for more efficient energy conversion. However, the switching control techniques remained unchanged.

Cycloconverters regained interest in the early 1970s, championed by B. R. Pelly and L. Gungyi. Pelly and Gungyi a produced detailed analysis of the operation of the cycloconverter, as well as of the harmonic analysis. A well-respected publication is B. R. Pelly, *Thyristor phase-controlled converters and cycloconverters; operation, control, and performance*, New York: Wiley-Interscience, 1971. Commercially available thyristors continued to be improved, resulting in faster switching speeds and lower losses. However, the issue of load current commutation remained problematic. One example of the problematic current commutation that may occur is when the current in a thyristor decays to zero under reverse-bias conditions (freewheeling). Without enough reverse recovery time, a function of the semiconductor physics, this thyristor does not completely turn off and will begin to conduct current as the voltage rises in the forward-bias direction. There are other commutation-failure examples described in the literature.

This load current commutation issue has been practically addressed by applying one of two design methodologies: a circulating current mode or a non-circulating current mode. The circulating current mode involved an overlap of the outgoing and incoming converters. The outgoing converter is comprised of the switch elements that are currently conducting current, and the incoming converter is comprised of the switch elements that will conduct the current after the commutation occurs. In some implementations, both converters are always on. On average, the voltage difference between the converters is made to be zero but instantaneously is non-zero. Inter group reactors (IGR) are used to limit the resulting short circuit current. Instantaneously, reactive power flows from the positive converter (the converter that conducts average positive load current), through the IGR, through the negative converter (the converter that conducts average negative current), and then back into the source. This circulating current ensures that the load current does not became discontinuous and could naturally commutate at exactly the right moment as determined by the characteristics of the load circuit. However, the circulating current mode results in poor efficiency and poor source power factor. These drawbacks, coupled with the difficulty of implementing the phase angle modulation, ensured that the cycloconverter still remains a less common topology.

The non-circulating current mode involves operation of, at most, one converter at a time (positive converter or negative converter). Dead time is added to ensure that the outgoing converter is completely turned off prior to turning on the incoming converter—alleviating the requirement of the inter-group reactor and improving efficiency. However, this dead-time adds distortion at the zero-crossing as the load current becomes zero for a finite time. This distortion also adds to the harmonic pollution of the input sources. Despite these problems, this technique became a very popular implementation of the cycloconverter. A well-known limitation of this technique is the requirement for accurate knowledge of the current zero-cross. Uncertainty in the sensing of the load current due to ripple or other noise can complicate the control action.

Pelly described various commutation methods such as "the fundamental current" and "the first current zero technique." Theoretically, the fundamental current technique results in commutation at exactly the correct instant. Practically, the fundamental current waveform is difficult to obtain, since low-pass filtering adds phase shift, which is difficult to compensate. Other techniques, such as the first-current zero technique, purposely introduce dead-time by turning off the outgoing converter the instant the actual load current first becomes zero. For a load current with a large ripple component, the outgoing converter is thus turned off for a substantial period of time before the fundamental component of the load current crosses zero. This current commutation issue continues to be a significant hurdle, and commercial cycloconverters function only because of skilful tweaking by talented engineers.

Load current sensing is complicated by detector sensitivity over an entire range of operation from the full load current to the thyristor holding current. To overcome this inherent uncertainly, window detectors have been used with a dead band around the zero current cross. Alternative methods of indirectly sensing load current polarity include sensing the thyristor forward-voltage drop or detecting voltage spikes on diodes as they transition from forward-conducting to reverse-blocking.

Cycloconverters were re-examined in the 1980s and improved by the use of a high-frequency resonant link. The high-frequency resonant link allowed the cycloconverter bridge voltage (input voltage) to be made zero for a period of time. Thus, load current commutation could be performed without danger of shorting the input supply. Most of the papers discussing this method focus on the control and operation of the resonant link.

A circuitry topology referred to as a "matrix converter" has also emerged. The matrix converter has been more broadly used as its applications include both AC—AC conversion and DC-AC conversions. Like the cycloconverter, the matrix converter eliminated a need for internal energy storage and a DC link by connecting the load directly to the source through a matrix of switches. In principle, arbitrary input to output voltage and frequency conversion is possible. However, unlike the cycloconverter, the matrix converter is forced-commutated and does not include freewheeling current paths. The matrix switch configuration needs to provide a current path during operation. As such, simultaneous control and commutation is a significant challenge.

In 1990, a DC-AC conversion method, referred to as a pulse width modulated (PWM) cycloconverter, was introduced. This new conversion method applies AC—AC converter techniques to the challenges of inverters for alternative energy systems and uninterruptible power supplies. There are two techniques in the literature describing the operation of the PWM cycloconverter, both using a square wave derived from a DC source, such as a fuel cell or photovoltaic panel, as the oscillating input voltage source—often called an AC link. In the first technique, the square wave is generated upstream of the cycloconverter by a separate switching power supply. In the second technique, the square wave is generated such that the edge-timing lends itself to a gating process that results in an output waveform at the load that would match the waveform obtained from a conventional pulse width modulated inverter. In either technique, the relatively high frequency of the AC link, dictated by the fidelity requirements of the PWM process, requires proper commutation of load current.

In a switched cycloconverter, commutation can occur by one of two methods, natural or forced. Natural commutation is defined to occur when current commutates solely due to the characteristics of the circuit and without switch action. Hence, the precise timing of the commutation is uncontrolled. Forced commutation occurs when explicit switching is used to purposely commutate current from one switch pair to another or to force a current zero-cross. The non-circulating current method (deadtime method) is an example of forced commutation while the circulating current method (both converters always on plus the IGR) is an example of natural current commutation.

Forced commutation has many well known negative effects such as increased switching losses, generation of electromagnetic interference, and poor waveform quality due to zero-cross distortion and sensitivity to the timing of the switching. The use of the IGR to achieve natural commutation also has substantial losses in the IGR, increased size and weight due to the IGR, and poor input power factor due to the circulating current in the IGR.

In view of the above described techniques, it would be desirable to provide a cycloconverter that facilitates natural commutation and mitigates the necessity for inter-group reactors (circulating current mode) and inter-group switching dead time (non-circulating current mode).

BRIEF SUMMARY OF THE INVENTION

The present invention is defined by the appended claims. This description summarizes some aspects of the present embodiments, and should not be used to limit the claims.

One aspect is to provide a system for controlling a commutation of a load current in an AC-to-AC converter. The system comprises a converter that includes a plurality of switching elements, an energy source that provides an oscillating voltage and is connected to the converter, an electrical load connected to the converter, and a controller that controls the converter, and monitors the oscillating voltage and the load current delivered to the electrical load. The controller determines a plurality of states of the converter, each of the plurality of states representing a corresponding conducting set of the plurality of switching elements, and performs switches between the plurality of states based on polarity commutations of the load current in the electrical load and polarity commutations of the oscillating voltage.

Another aspect is to provide a method for commutating a single-phase load current of a cycloconverter output. The method comprises providing an oscillating voltage to the cycloconverter which has a bidirectional output bridge, determining when a polarity commutation of the source voltage occurs, inhibiting the gating of a first set of elements that impose the source voltage across the load to provide a freewheeling current path for the load current, determining when the load current flowing through the freewheeling current path crosses a non-zero current threshold, and gating on a second set of elements that enables a polarity commutation (zero-cross) of the load-current and supports the commutated polarity of the source voltage.

A further aspect is to provide a state-machine based method for controlling a cycloconverter. The state-machine based method provides an AC-to-AC converter which is coupled to an electrical load and to an energy source supplying an oscillating voltage, and identifies a plurality of machine states, each of the plurality of machine states representing a corresponding conducting set of switching elements of a bidirectional output bridge of the converter. The method also monitors polarity commutations of the oscillating voltage and of the load current, and switches between the plurality of machine states based on the polarity commutations of the oscillating voltage and load current.

Still, another aspect is to provide a method for commutating a multiphase load current of a cycloconverter output. The commutating method provides an oscillating source voltage to the three-phase cycloconverter which has a three-phase bidirectional output bridge with a phase-leg for each of the three phases of the load current, and determines when a polarity commutation of the source voltage occurs. The method also inhibits a gating of a corresponding first set of elements that imposes the source voltage to provide a freewheeling current path for each of the corresponding phase currents, determines when the corresponding phase load current flowing through the freewheeling current path crosses a non-zero current threshold, and gates on a second set of elements that enables a polarity commutation (zero-cross) of the corresponding phase load current and supports the commutated polarity of the corresponding phase of the source voltage.

Illustrative and exemplary embodiments of the invention are described in further detail below with reference to and in conjunction with the figures.

BRIEF DESCRIPTION OF THE DRAWINGS

The components and drawings need not necessarily be to scale, and instead serve merely to schematically illustrate the fundamental concepts of the invention. The invention, including its construction and method of operation, is illustrated diagrammatically in the drawings, in which.

DETAILED DESCRIPTION OF THE INVENTION

Figure 1:
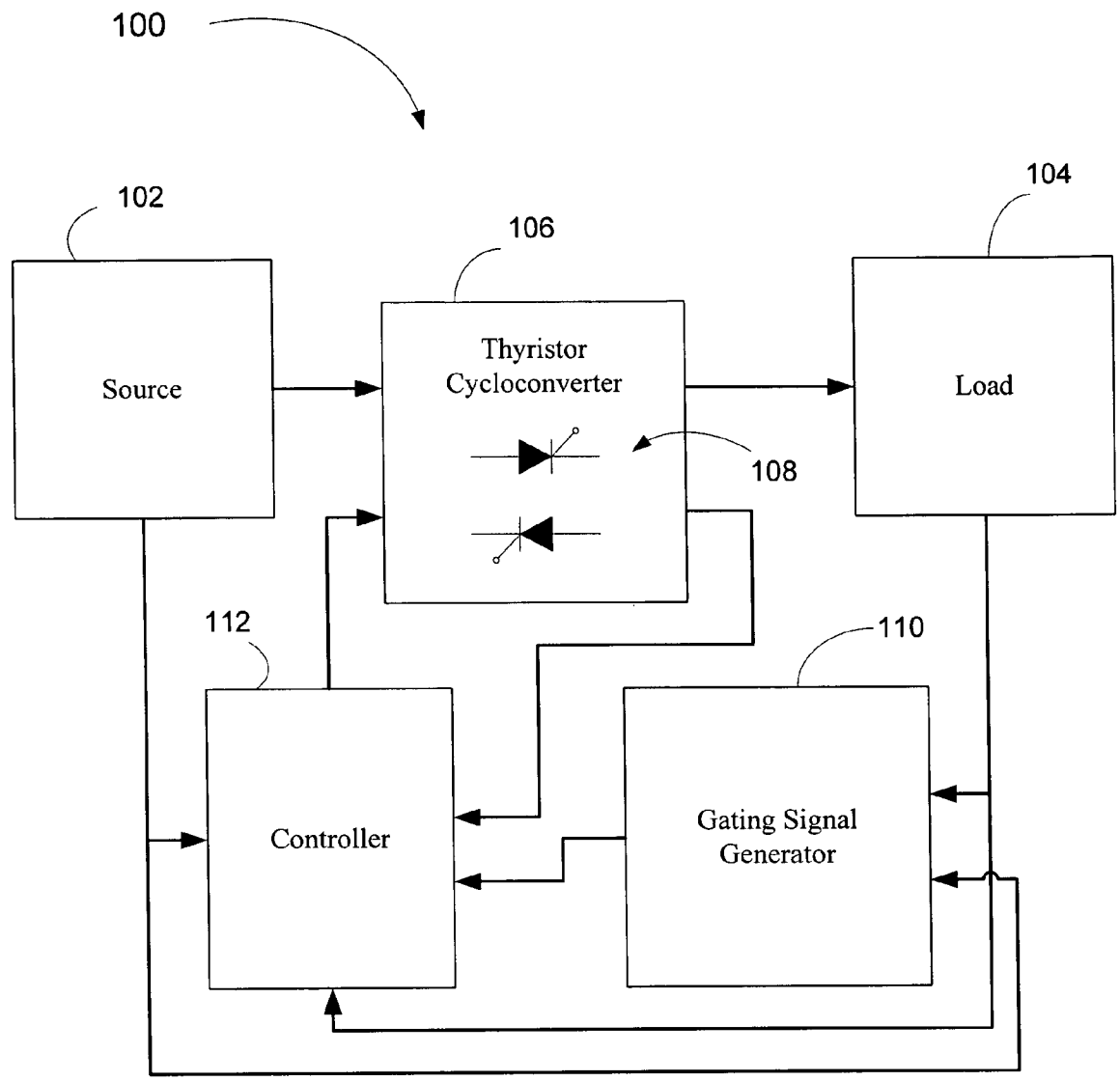
FIG. 1 is a block diagram illustrating an example circuit suitable for controlling a commutation of a load current.

While the present invention may be embodied in various forms, there is shown in the drawings and will hereinafter be described via exemplary and non-limiting embodiments, with the understanding that the present disclosure is to be considered an exemplification of the invention, and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a or an" object is intended to also denote one of a possible plurality of such objects.

Turning now to the figures, FIG. 1 shows an example circuit 100 suitable for controlling a commutation of a load current. Circuit 100 comprises an AC voltage source 102 coupled to a load 104 via a cycloconverter 106. Cyclconverter 106 comprises switch elements 108 configured to commute a load current supplied to load 104. Circuit 100 further comprises a gating signal generator 110, which holds a voltage reference for load 104, and a controller 112, which controls the cycloconverter 106 by steering gate pulse signals received from gate signal generator 110 to appropriate switch elements 108 to prevent commutation failure of the load current. Gating signal generator 110 further comprises timing circuits (not shown) used to derive gate signals to turn each of switch elements 108 on and off. Although shown in FIG. 1 as separate circuit components (separate diagram blocks), gating signal generator 110 and controller 112 can be combined into one circuit component.

Figure 2:
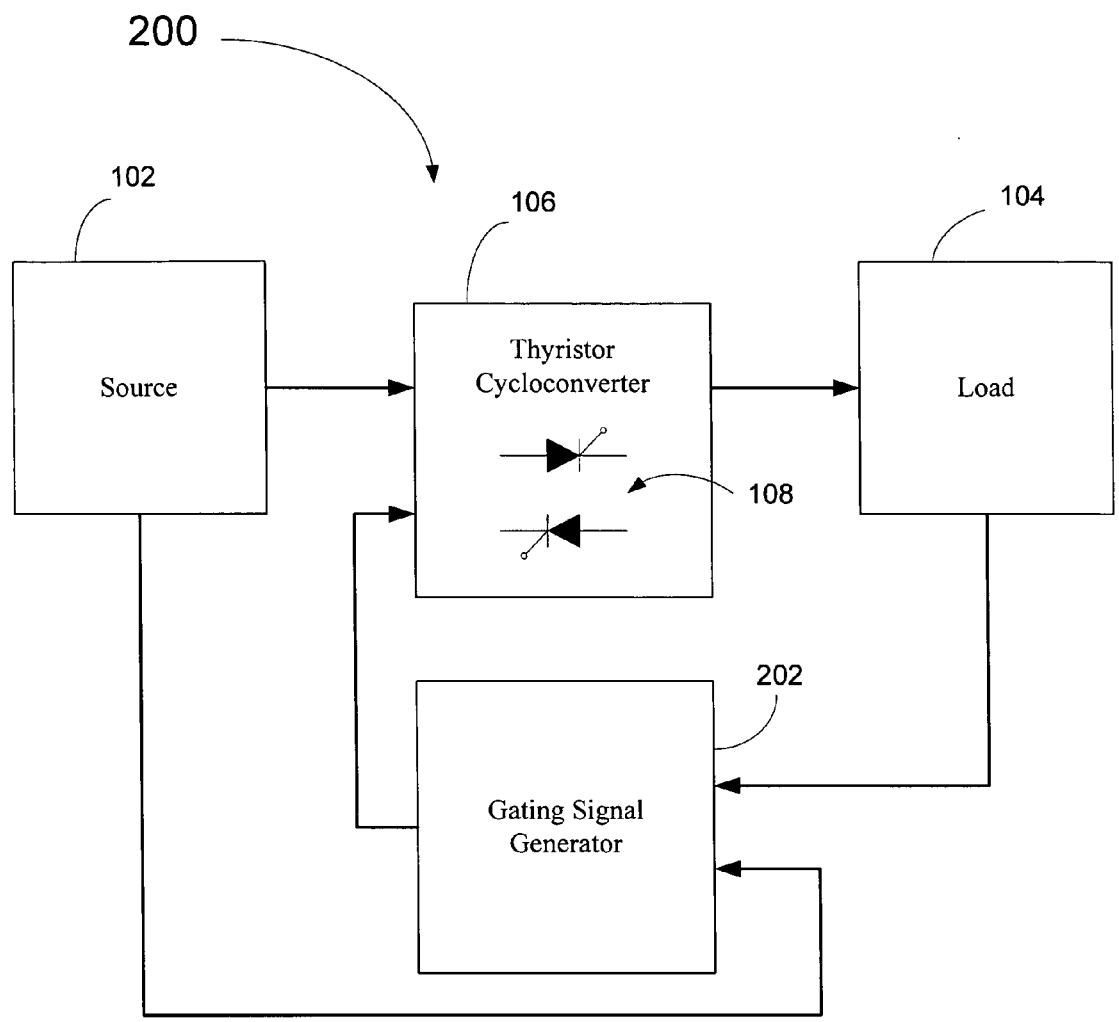
FIG. 2 is a block diagram illustrating an example of a prior art circuit suitable for commutating a load current.

FIG. 2 shows a block diagram illustrating an example of a prior art circuit 200 suitable for commutating a load current without using a controller to steer gate pulse signals received from gate signal generator 202 to appropriate switch elements 108 to prevent commutation failure of the load current. In this prior art circuit 200, gating signal generator 202 provides dead-time between gate signals as needed for the dead-time technique used during the commutation of the load current.

Figure 3:
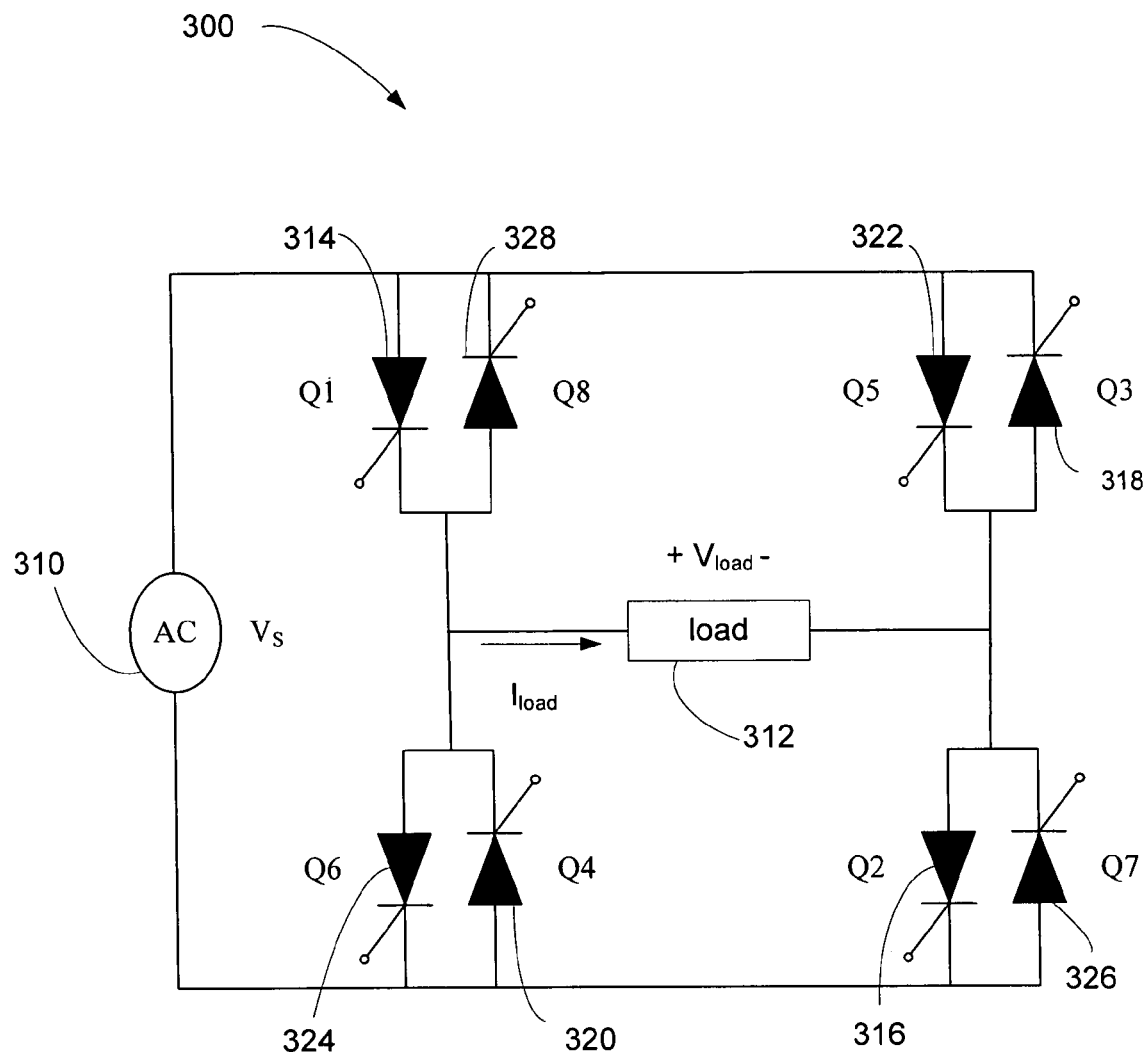
FIG. 3 is schematic diagram of a cycloconverter with a four quadrant output bridge.

FIG. 3 shows a single-phase cycloconverter output-bridge 300. As with typical AC-to-AC converters, four-quadrant switches are needed to conduct bidirectional current and block bidirectional voltage. To realize this functionality, two anti-parallel unidirectional conducting switches are utilized in the cycloconverter 300, so that each unidirectional conducting switch is used to carry one polarity of load current and block both polarities of source voltage.

Cycloconverter 300 includes a source 310 that provides an oscillating voltage $V_S$ to a load 312 and to eight unidirectional conducting switches Q1–Q8 314–328. For the sake of simplicity, hereafter the oscillating voltage $V_S$ may be shown and described as a square-wave oscillating voltage (as would be the case in a PWM cycloconverter), but can be any other oscillating voltage (including the sinusoid in a conventional cycloconverter). The oscillating voltage $V_S$ has a frequency greater than a frequency of a targeted load voltage. The eight conducting switches Q1–Q8 314–328 are arranged in pairs of separately controlled anti-parallel switches, a pair of switches for each leg of the four quadrant "H" bridge. Although, in FIG. 3 the conducting switches Q1–Q8 314–328 are represented as silicon controlled rectifier (SCR) thyristors, alternate unidirectional switch-elements can be used. Switches Q1–Q8 314–328 are gated on (commanded to turn on) in pairs to establish and maintain a continuous current path from voltage source 10 through the load 12, and are referred to as switch pairs, (Q1, Q2) 314, 316, for example.

Figure 4A:
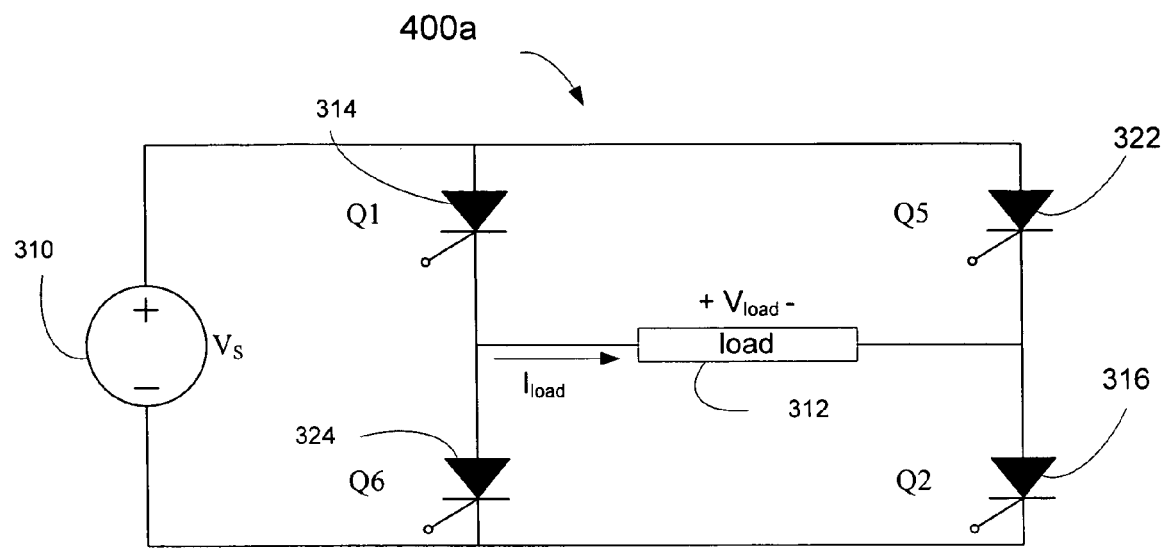
FIGS. 4a–4b are schematic diagrams of positive and negative converters of the cycloconverter of FIG. 3 for positive and negative source voltage polarity respectively.
Figure 4B:
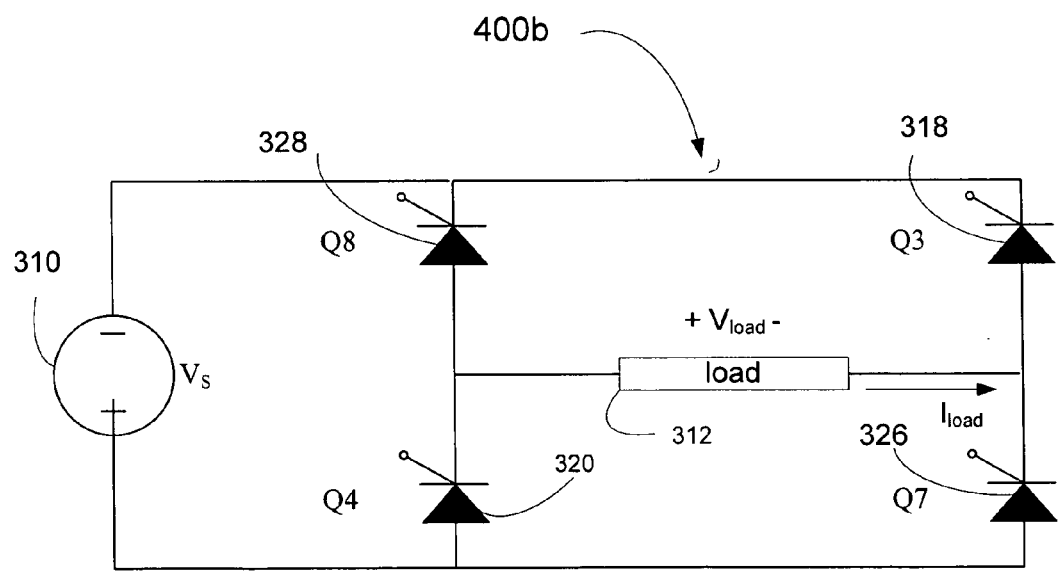

Switches of the bidirectional bridge cycloconverter are separated into two converter groups based on a polarity of the source voltage $V_S$, as shown in FIGS. 4a and 4b. A positive converter 400a comprises switch pairs (Q1, Q2) 314, 316 and (Q5, Q6) 322, 324. A negative converter 400b comprises switch pairs (Q3, Q4) 318, 320 and (Q7, Q8) 326, 328. In the remainder of this paper, references to positive converters or to negative converters are meant to indicate that the corresponding converters are conducting current during positive polarity or negative polarity of the source voltage, respectively. As such, load current can be positive or negative in either positive or negative converters.

Figure 5A:
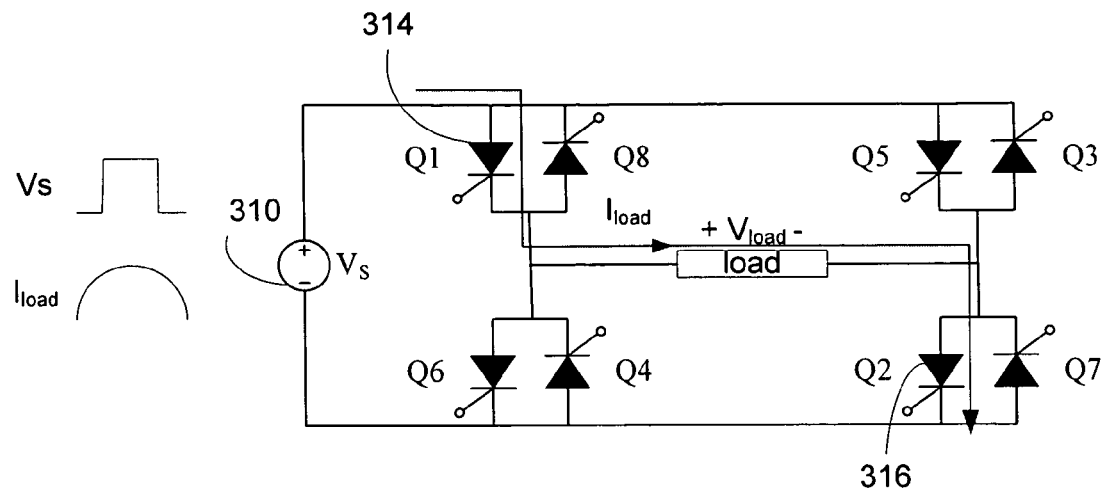
FIGS. 5a–5d are schematic diagrams illustrating static switch configurations of the cycloconverter of FIG. 3.
Figure 5B:
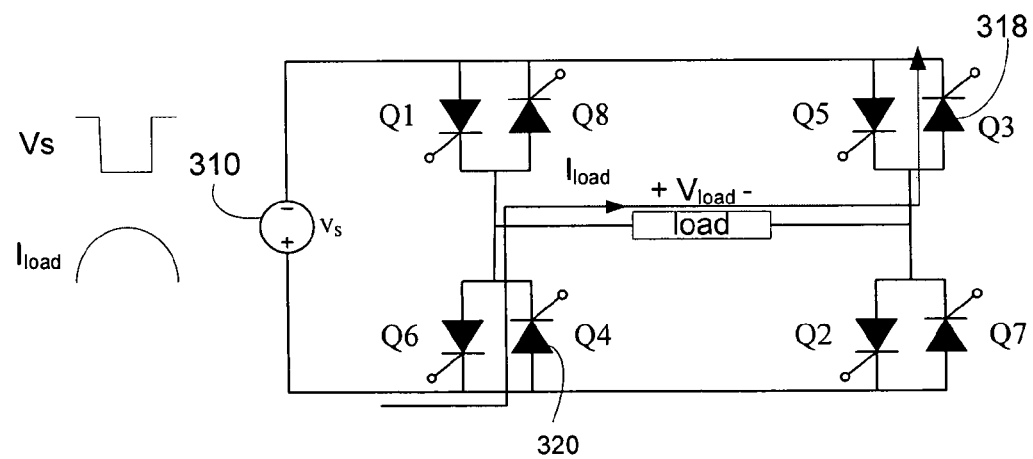
Figure 5C:
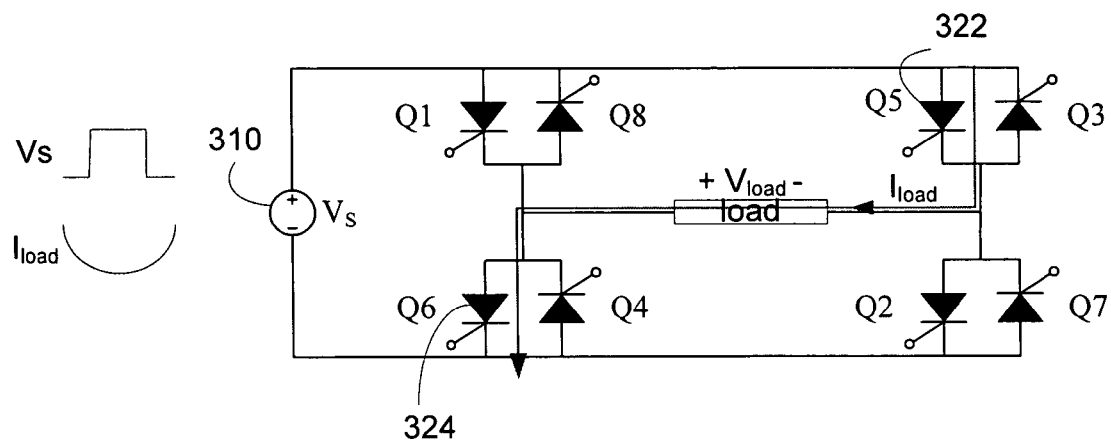
Figure 5D:
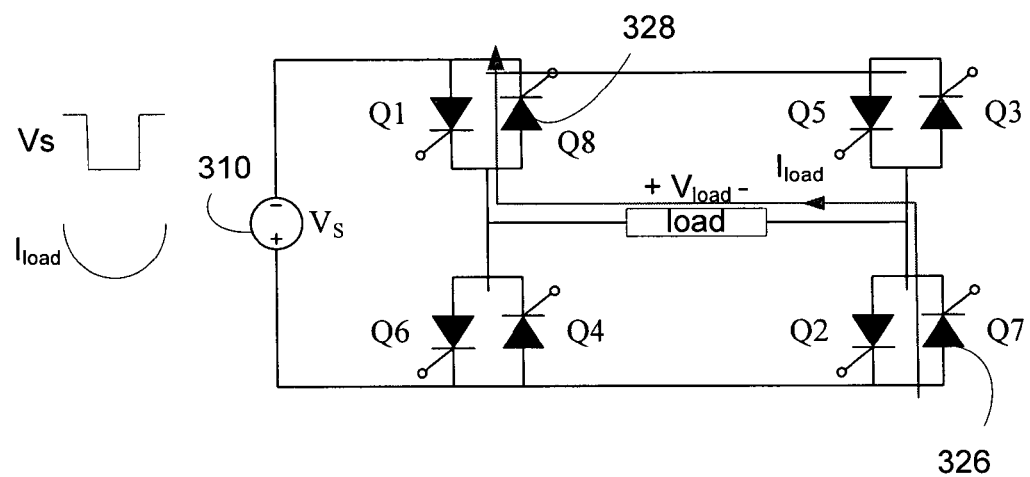

There are four possible switch configurations derived from all potential combinations of source voltage $V_S$ and load current $I_{load}$ in the cycloconverter 300, as shown in FIGS. 5a–5d. For positive load current $I_{load}$, switches (Q1, Q2) 314, 316 of the positive converter 400a conduct during positive source voltage $V_S$, as shown in FIG. 5a, and switches (Q3, Q4) 318, 320 of the negative converter 400b conduct during negative source voltage $V_S$, as shown in FIG. 5b. Similarly, for negative load current $I_{load}$, switches (Q5, Q6) 322, 324 of the positive converter 400a conduct during positive source voltage $V_S$, as shown in FIG. 5c, and switches (Q7, Q8) 326, 328 of the negative converter 400b conduct during negative source voltage $V_S$, as shown in FIG. 5d.

Figures 6A, 6B, 6C, 6D:
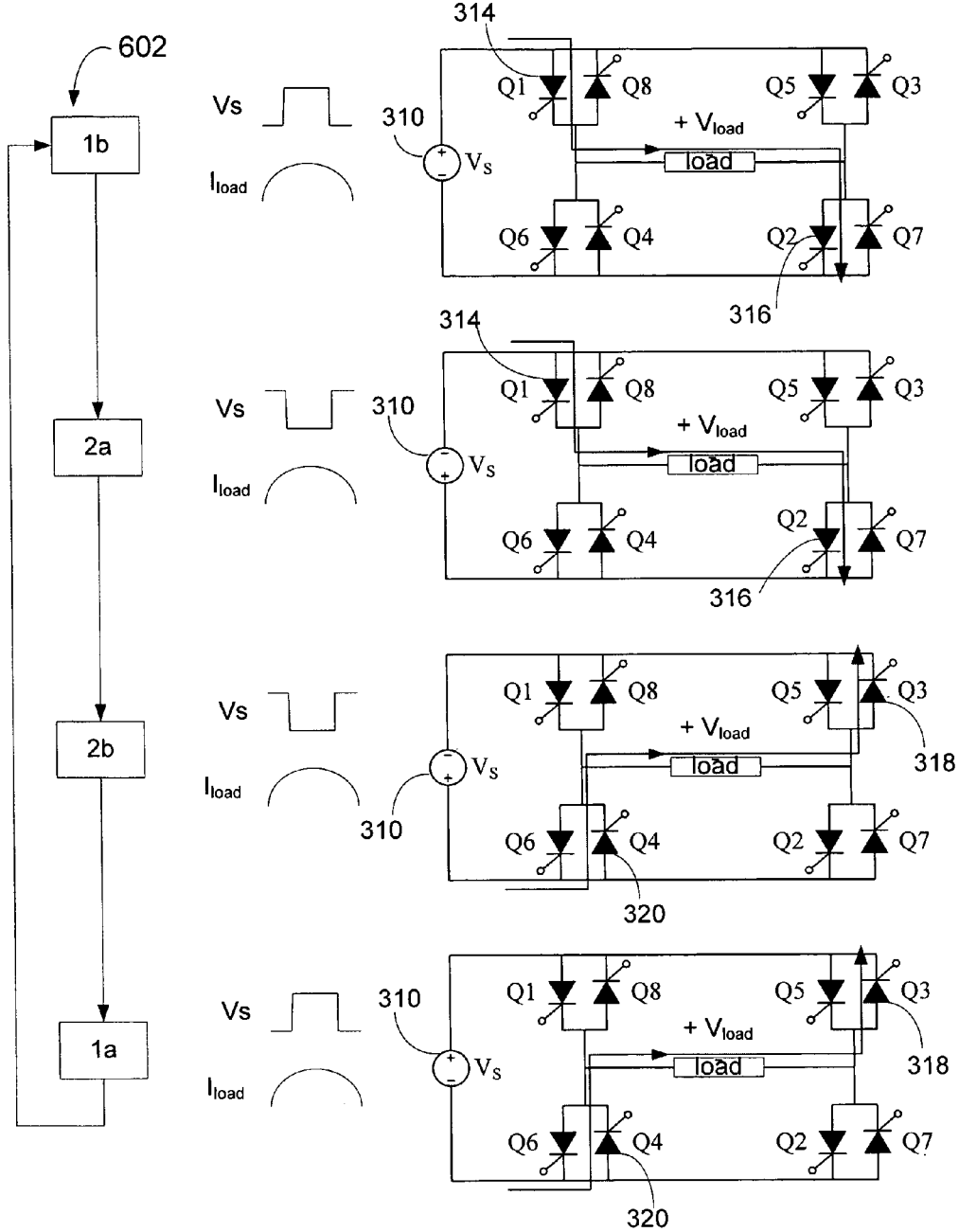
FIGS. 6a–6d are schematic diagrams illustrating a source voltage commutation during a positive load current.

Now referring to FIGS. 6a–6d, a first switching sequence (1b→2a→2b→1a→1b) 602 of a source voltage commutation during a positive load current $I_{load}$ is shown in four schematic diagrams. In FIG. 6a, first switching sequence 602 begins at interval 1b of the first switching sequence 602, where positive load current $I_{load}$ increases in magnitude while being conducted via gated switch pair (Q1, Q2) 314, 316 of the positive converter 400a with a positive source voltage $V_S$, as in the configuration in FIG. 5a. Thus, FIG. 6a reflects the FIG. 5a configuration of the cycloconverter 300 with gated switch pair (Q1, Q2) 314, 316 (interval 1b). In FIG. 6b, the first switching sequence 602 is at interval 2a where the source voltage $V_S$ has switched polarity to become negative. Thus, causing the gating signal to be suppressed and positive load current $I_{load}$ to freewheel through the last gated switch pair (Q1, Q2) 314, 316 while decreasing in magnitude.

In FIG. 6c, the first switching sequence 602 reaches interval 2b where a gating signal has been applied to the incoming converter, causing positive load current $I_{load}$ to increase in magnitude while being conducted via newly triggered switch pair (Q3, Q4) 318, 320 of the negative converter 400b with a negative source voltage $V_S$. Thus, FIG. 6c reflects the FIG. 5b configuration of the cycloconverter 300 with gated switch pair (Q3, Q4) 318, 320. In FIG. 6d, the first switching sequence 602 is at interval 1a where the source voltage $V_S$ has switched polarity to become positive, causing the gating signal to be suppressed and positive load current $I_{load}$ freewheels through last gated switch pair (Q3, Q4) 318, 320 while decreasing in magnitude. The cycle repeats when the next gated switch pair (Q1, Q2) 314, 316 conducts the positive load current $I_{load}$ while the source voltage $V_S$ is positive in FIG. 6a.

Figures 7A, 7B, 7C, 7D:
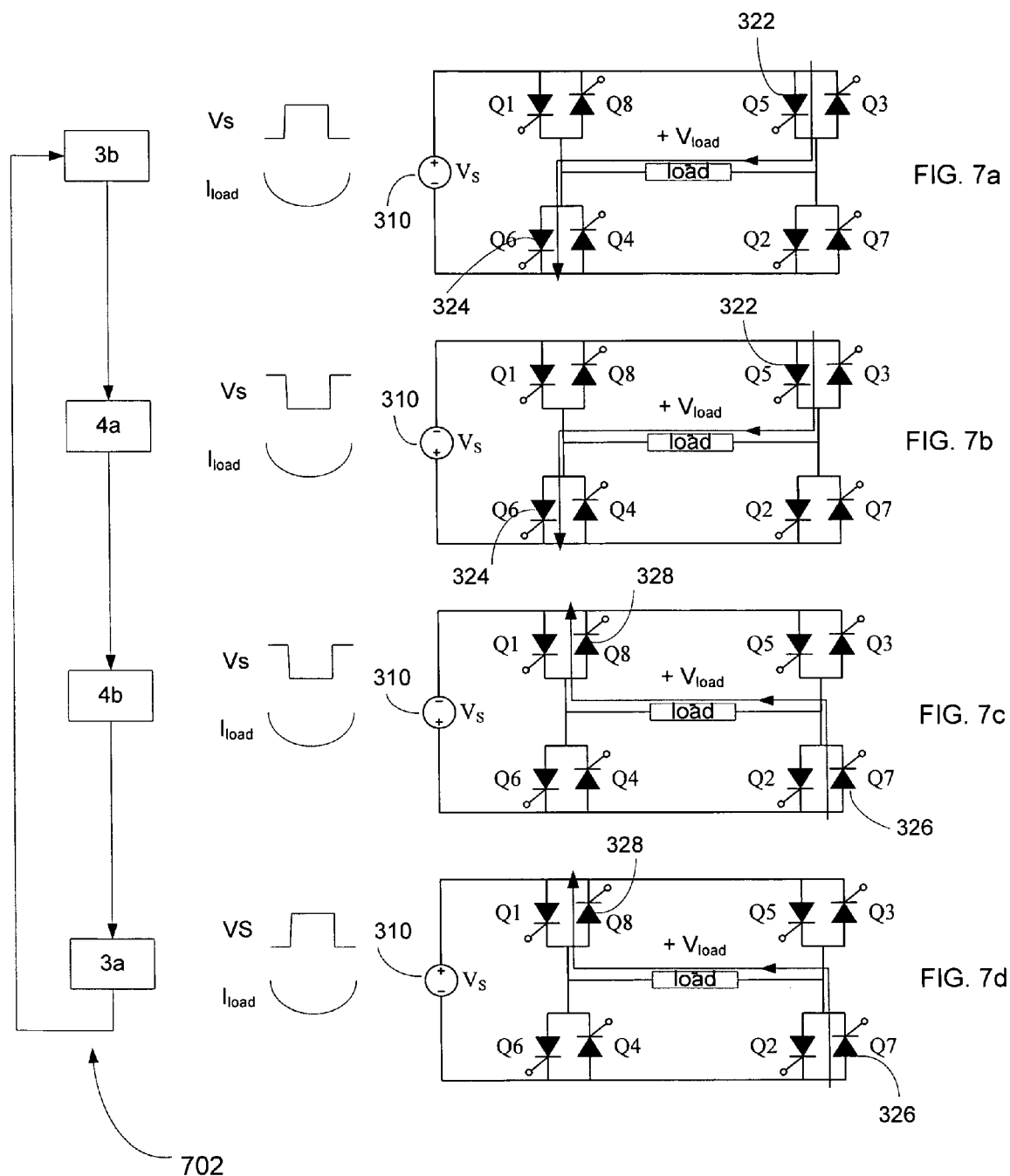
FIGS. 7a–7d are schematic diagrams illustrating a source voltage commutation during a negative load current.

Now referring to FIGS. 7a–7d, a second switching sequence (3b→4a→4b→3a→3b) 702 of a source voltage commutation during a negative load current $I_{load}$ is shown in four schematic diagrams. In FIG. 7a, the second switching sequence 702 begins at interval 3b where negative load current $I_{load}$ increases in magnitude while being conducted via gated switch pair (Q5, Q6) 322, 324 of the positive converter 400a with a positive source voltage $V_S$ as in the configuration in FIG. 5c. Thus, FIG. 7a reflects the FIG. 5c configuration of the cycloconverter 300 with gated switch pair (Q5, Q6) 322, 324 (interval 3b). In FIG. 7b, the second switching sequence 702 is at interval 4a where negative load current $I_{load}$ freewheels through last gated switch pair (Q5, Q6) 322, 324 while decreasing in magnitude, and the voltage $V_S$ has switched polarity to become negative.

In FIG. 7c, the switching sequence 702 reaches interval 4b where negative load current $I_{load}$ increases in magnitude while being conducted via triggered switch pair (Q7, Q8) 326, 328 of the negative converter 400b with a negative voltage $V_S$. In FIG. 700d, the switching sequence 702 is at interval 3a where negative load current $I_{load}$ freewheels through the last gated switch pair (Q7, Q8) 326, 328 while decreasing in magnitude, and the voltage $V_S$ has switched polarity to become positive. The cycle repeats when the next gated switch pair (Q5, Q6) 322, 324 conducts the negative load current while the voltage $V_S$ is positive in FIG. 7a.

By convention, the conducting pair of switches that is scheduled to be turned-off is referred to as "the outgoing converter" and the next conducting pair of switches that is scheduled to be turned-on is referred to as "the incoming converter." During commutation of load current $I_{load}$, the incoming converter is chosen to support the source voltage $V_S$ and prevent commutation failures in the cycloconverter. When the load current $I_{load}$ is positive, commutating current from the positive converter 400a (the outgoing converter) to the negative converter 400b (the incoming converter) involves turning on switch pair (Q3, Q4) 318, 320 and then turning-off switch pair (Q1, Q2) 314, 316. A continuous path for the load current $I_{load}$ is thus maintained and the opposite polarities of the switching devices prevent short-circuiting of the source voltage $V_S$. A similar pattern is followed for negative load current $I_{load}$.

Figure 8:
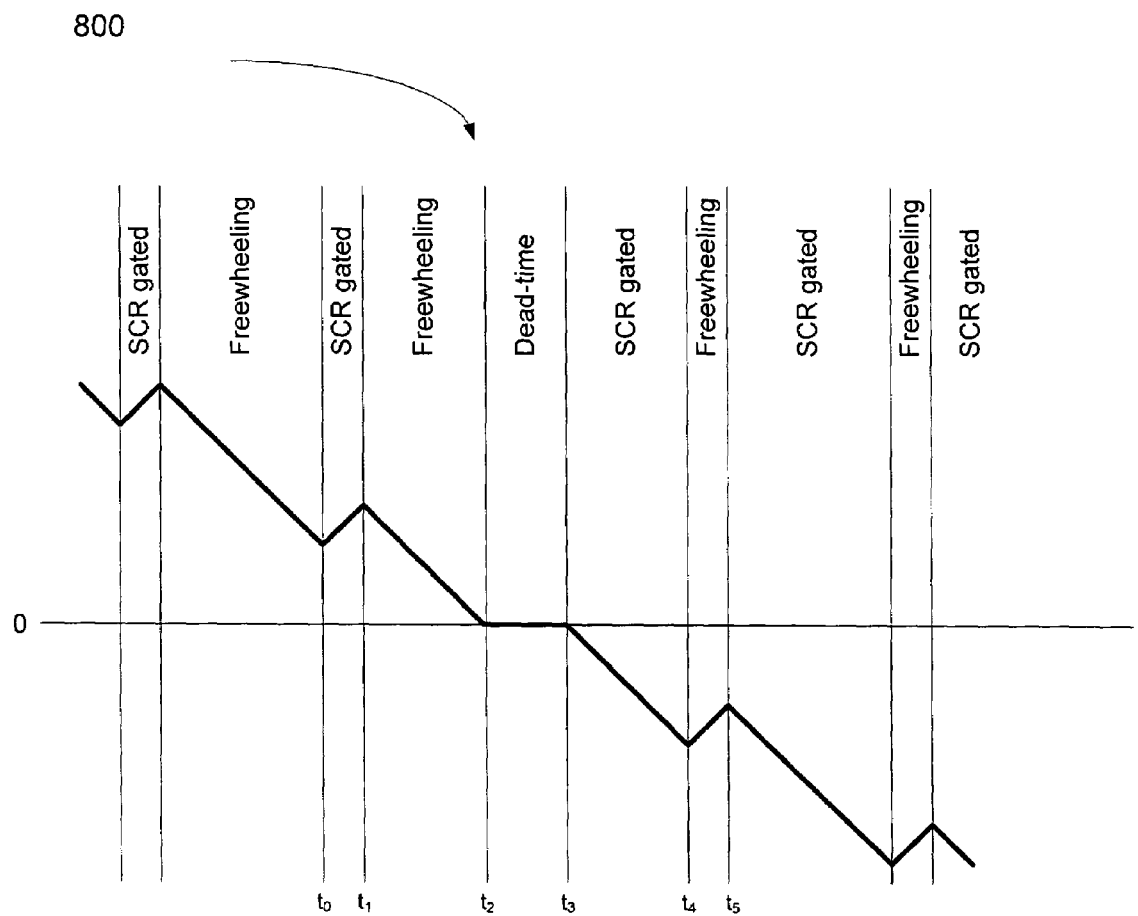
FIG. 8 is a graph illustrating a zero-cross of an output bridge load current of a silicon controlled rectifier with dead time.

Commutation of the load current $I_{load}$ during a load current zero-cross is substantially problematic. For positive source voltage $V_S$, as shown in FIG. 4a, switches (Q1, Q2) 314, 316 conduct positive load current $I_{load}$. In FIG. 8, graph 800 shows that between time $t_0$ and time $t_1$ (gated interval) positive load current $I_{load}$ increases in magnitude while being conducted via triggered switch pair (Q1, Q2) 314, 316 of the positive converter 400a with a positive source voltage $V_S$. The $t_0$ to $t_1$ time interval can be referred to as a gated interval. Between time $t_1$ and $t_2$, (freewheeling interval), positive load current $I_{load}$ freewheels through the last gated switch pair (Q1, Q2) 314, 316 while decreasing in magnitude. The $t_1$ to $t_2$ time interval can be referred to as a freewheeling interval. As the load current $I_{load}$ reaches zero at time $t_2$, switch pair (Q5, Q6) 322, 324 needs to be turned on in order to conduct negative current $I_{load}$ with a positive source voltage.

However, turning on switch pair (Q5, Q6) 322, 324, while switch pair (Q1, Q2) 314, 316 is still on, results in a short circuit of the input voltage source $V_S$. As such, a finite time period between time $t_2$ and time $t_3$, a reverse recovery time, is needed between the extinction of current in the outgoing converter and conduction of current in the incoming converter. During this dead-time, $t_2$ to $t_3$, the load current $I_{load}$ becomes discontinuous and stationary at a zero value, as shown in FIG. 8. Further, after time $t_3$, load current $I_{load}$ becomes negative via a forced commutation event which occurs due to deliberate switching.

Figure 9:
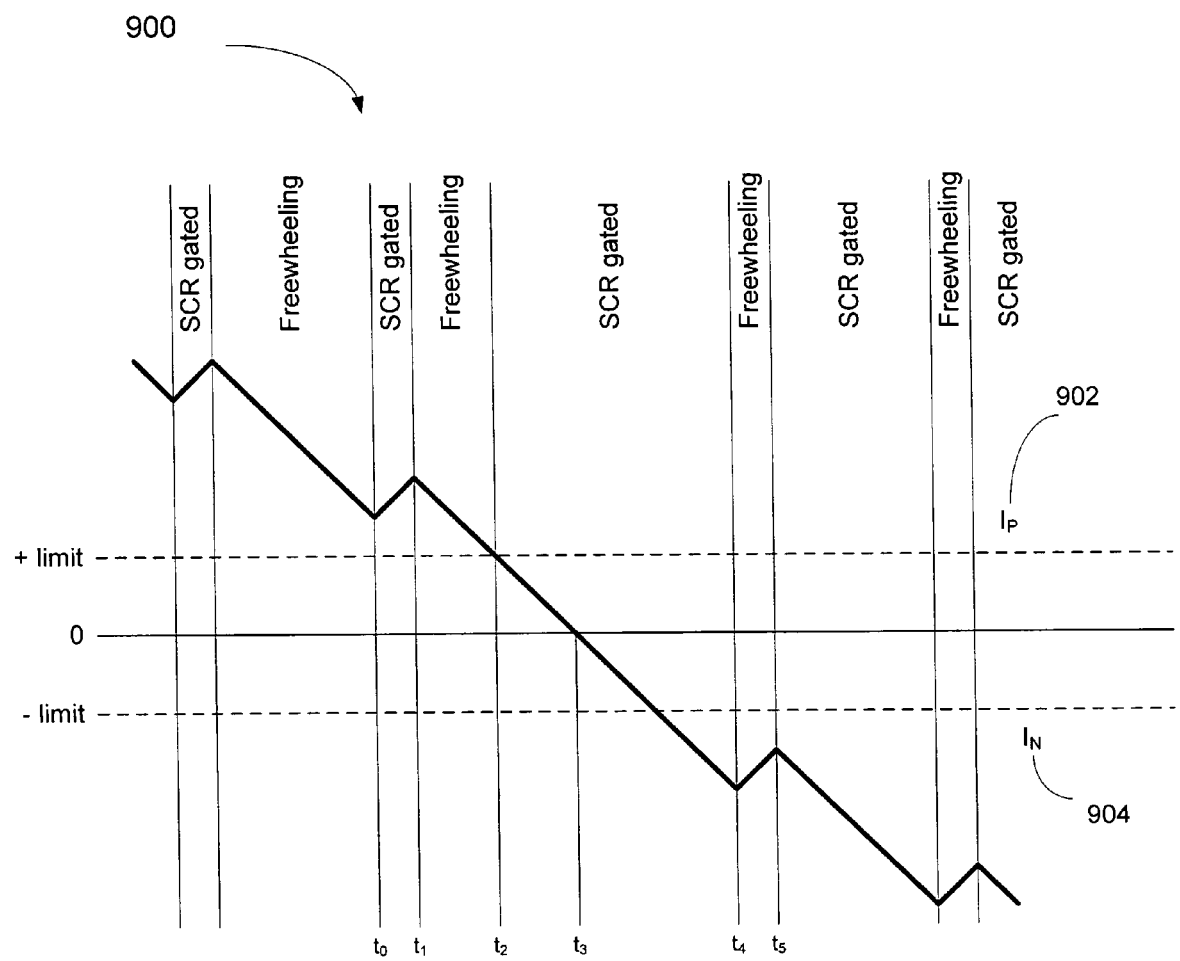
FIG. 9 is a graph illustrating a zero-cross of an output bridge load current of a silicon controlled rectifier without dead time.

In the proposed commutation technique, suitable for the PWM cycloconverter power conversion systems, the cycloconverter 300 is controlled such that the load current $I_{load}$ is allowed to commutate naturally, as determined by the characteristics of the load, by proper sequencing of the switching in the output bridge. The proposed switching technique identifies the correct set of sequences of switching of the incoming converter such that, given the polarity of the source voltage $V_S$ no provision for the reverse recovery is required, the requirement for dead time is alleviated, and smooth commutation is provided for the load current $I_{load}$ through the zero cross as shown in FIG. 9. Thus, commutation failures are prevented and zero-cross distortions, inherent in existing techniques, are mitigated without using additional components that lower the energy conversion efficiency. This proposed switching technique expands the utility of the cycloconverter topology beyond industrial motor drives in that it facilitates implementation of a low-cost inverter design based on the PWM cycloconverter that is suitable for alternative energy systems or uninterruptible power supplies (UPS).

Now referring to FIG. 9, a graph 900 illustrating a zero cross of an output bridge load current of a silicon controlled rectifier without dead-time is shown. As shown in FIG. 9, load current $I_{load}$ crosses zero at time $t_3$ without dead-time. To accomplish this, once load current $I_{load}$ crosses a greater than zero current threshold $I_P$ 902 at time $t_2$, a switch pair is turned on that supports the polarity of the source voltage $V_S$ during this switching cycle but provides a conduction path for the load current reversal.

The proposed commutation technique is based on six assumptions of the operation of the thyristor-based PWM cycloconverter 300 of FIG. 3, as follows:

1. For every source voltage commutation, a load-current minimum always occurs during the freewheeling interval.
2. There exists a unique switch-pair that is gated for every transition in source voltage polarity.
3. Switching occurs only once per source voltage commutation.
4. There exists a threshold current level such that no source voltage commutation occurs prior to the load current zero-cross.
5. There exists a threshold current less than a ripple component of the load current but greater than the switch element (thyristor) holding current.
6. The frequency of the input AC source is greater than the desired cycloconverter output frequency.

Assumption 1 is verified by inspection of FIG. 8 where an absolute value of the magnitude of the load current $I_{load}$ is decreasing during a freewheeling interval (when the voltage imposed on the load is negative with respect to the load current) and increasing during a switch pair gated interval (when the voltage imposed on the load is positive with respect to the load current). Assumption 2 is satisfied by the requirements of providing a continuous load current path and avoiding shorting-out the source voltage $V_S$. Assumption 3 prevents commutation failure from reverse-recovery problems. Assumption 4, shown in FIG. 9, is fulfilled by choosing threshold current limits arbitrarily close to zero. Assumption 5 implies that the actual threshold limits be set near the holding current of the switch element. Assumption 6 is implemented by design.

Figure 10:
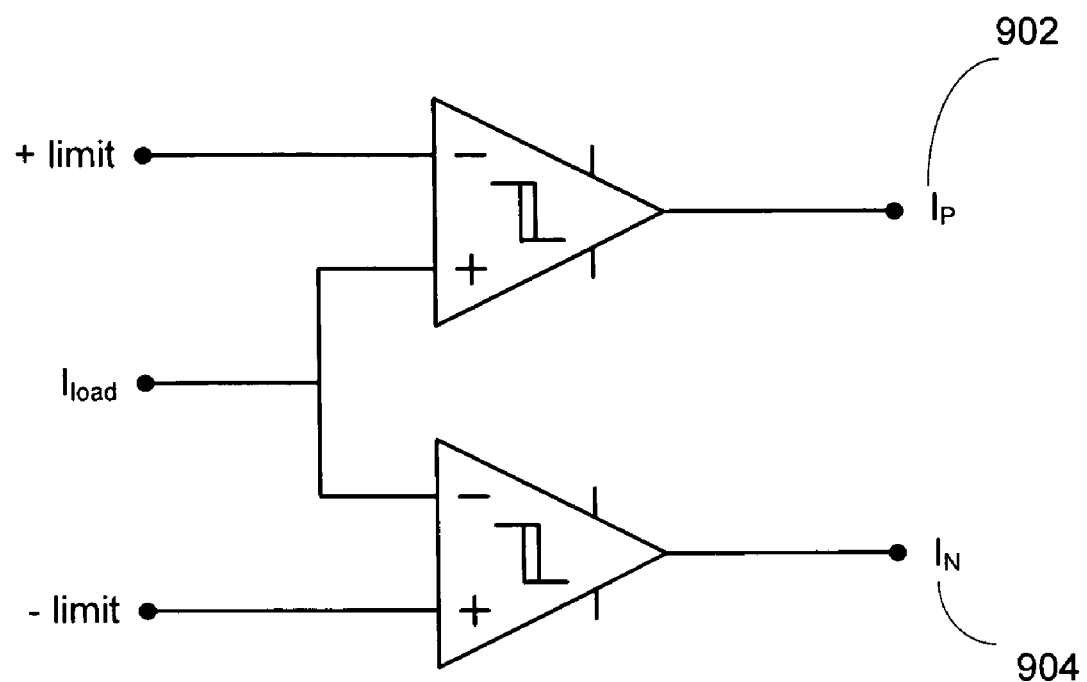
FIG. 10 is a schematic circuit of a current polarity window detector.

Threshold signals $I_P$ 902 and $I_N$ 904 are defined such that $I_N$ 904 (the negative current threshold) can be considered as a less-than-zero load current and $I_P$ 902 (the positive current threshold) as greater-than-zero load current. As such, by definition, $I_P=I_N=1$ is an invalid signal. Implementation of the current threshold limits $I_P$ 902 and $I_N$ 904 is shown as a windows comparator in FIG. 10.

The polarity of the load current $I_{load}$ is required but can be obtained by a variety of techniques. As such, signals $I_P$ 902 and $I_N$ 904 are defined such that:

$$I_P = I_{load} > +\lim \quad \text{Equation 1}$$

and $$I_N = I_{load} < -\lim \quad \text{Equation 2}$$

Prior to time $t_0$, the source voltage $V_S$ changes polarity (from negative to positive) and load current $I_{load}$ decreases and freewheels via the outgoing converter (last gated switch pair). At time $t_0$, the incoming converter switch pair is turned-on and imposes the positive source voltage $V_S$ across load 312 in a positive direction, resulting in an increase in the magnitude of the load current $I_{load}$. At time $t_1$, the source voltage $V_S$ commutates to become negative and gate-pulses to the switch pair are halted (gated off). The load current $I_{load}$ continues to decrease, freewheeling through the outgoing converter. When dead-time control is used, as in FIG. 8, the load current $I_{load}$ freewheels until reaching zero at time $t_2$. The load current $I_{load}$ remains zero until time $t_3$ when the next switch pair is gated-on. To avoid dead-time control, the load current $I_{load}$ is allowed to freewheel after time $t_1$ until it crosses the positive current threshold $I_p$ 902, at time $t_2$, at which point the switch pair of the incoming converter is gated-on to provide a conduction path for current reversal. The load current $I_{load}$ continues to flow through the freewheeling (outgoing converter) switch pair until $t_3$ when the current commutates to the already gated-on incoming converter switch pair.

In the dead-time technique, the incoming converter is gated on at time $t_3$ after a dead-time interval. In the proposed technique, $t_3$ occurs naturally as determined by the load characteristics. The incoming converter of both techniques is carrying increasing load current $I_{load}$ after $t_3$ until the source voltage polarity changes at $t_4$, completing the load current zero-cross commutation. In FIG. 9, between $t_2$ and $t_4$ no switching occurs, and at $t_3$ load current zero-cross is due to circuit characteristics and hence occurs naturally.

There are four possible sequences for commutating the load current $I_{load}$ through a zero-cross, as shown in FIGS. 11a–11d. In FIGS. 11a–11d, two pairs of schematic diagrams 1102–1104 and 1110–1112 illustrate positive to negative load current commutations for positive and negative source voltage, and two pairs of schematic diagrams 1106–1108 and 1114–1116 illustrate negative to positive load current commutations for positive and negative source voltage $V_S$.

Figure 11:
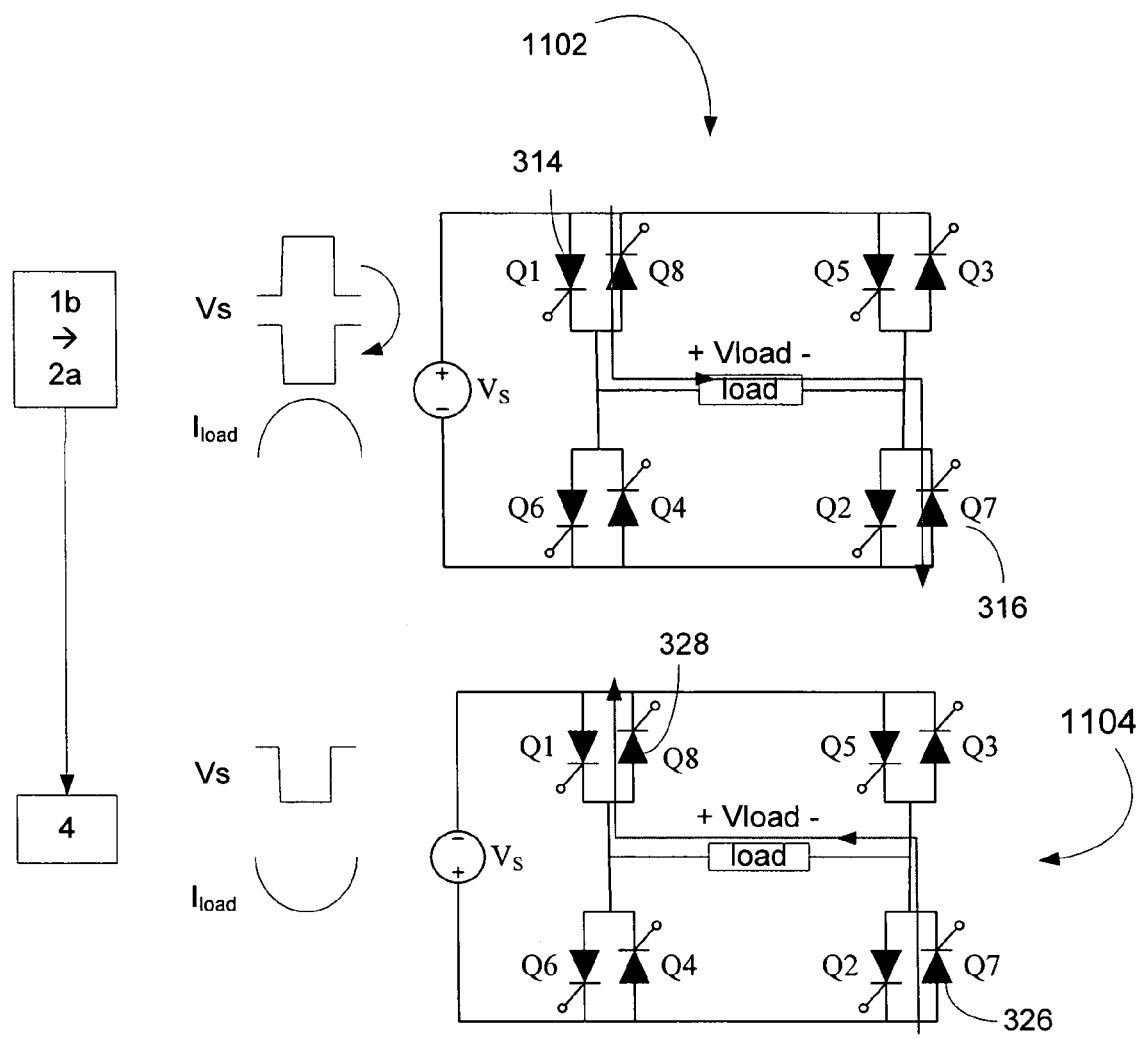
FIGS. 11a–11d are schematic diagrams of load current zero-cross commutations.
Figure 11:
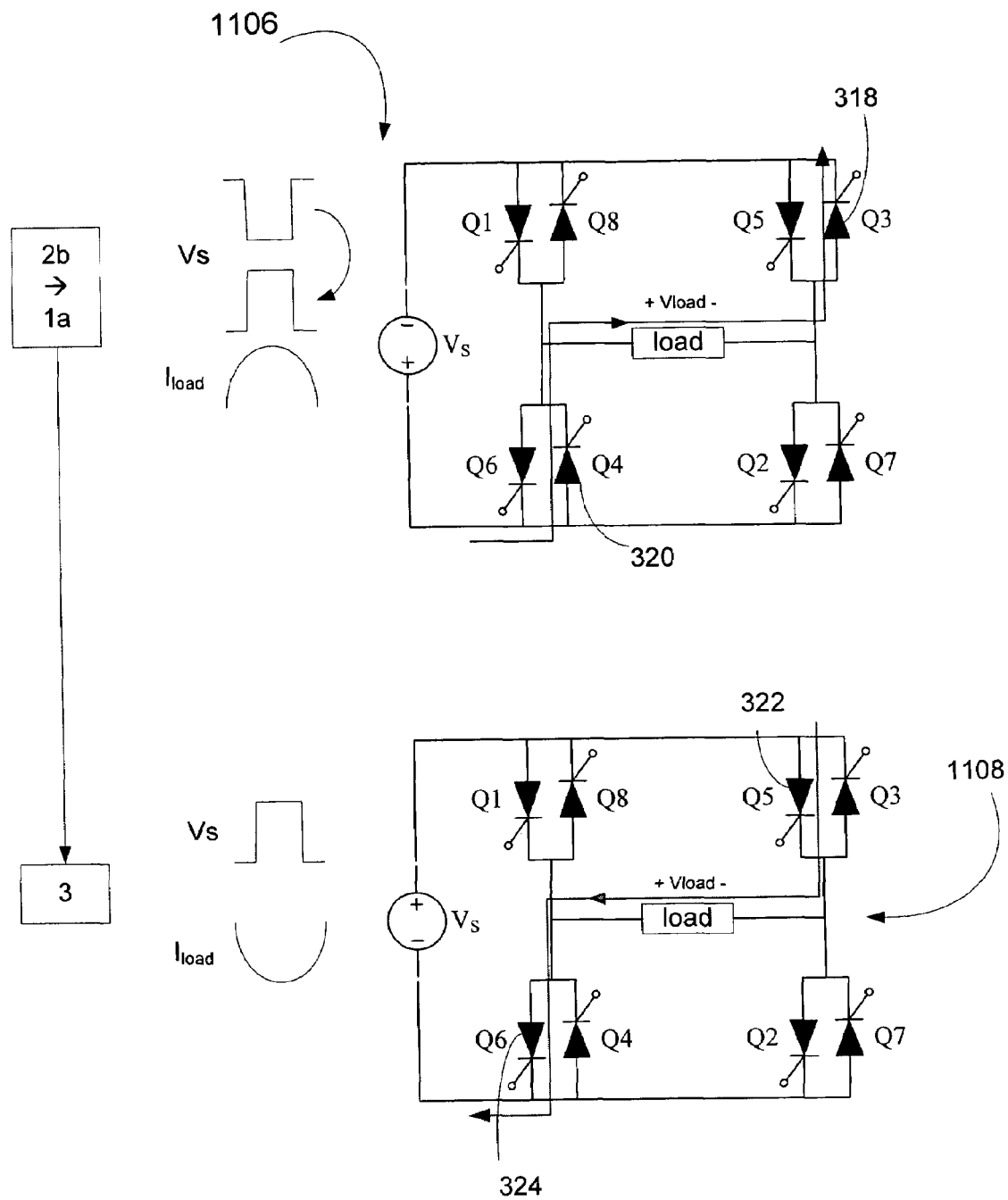
Figure 11:
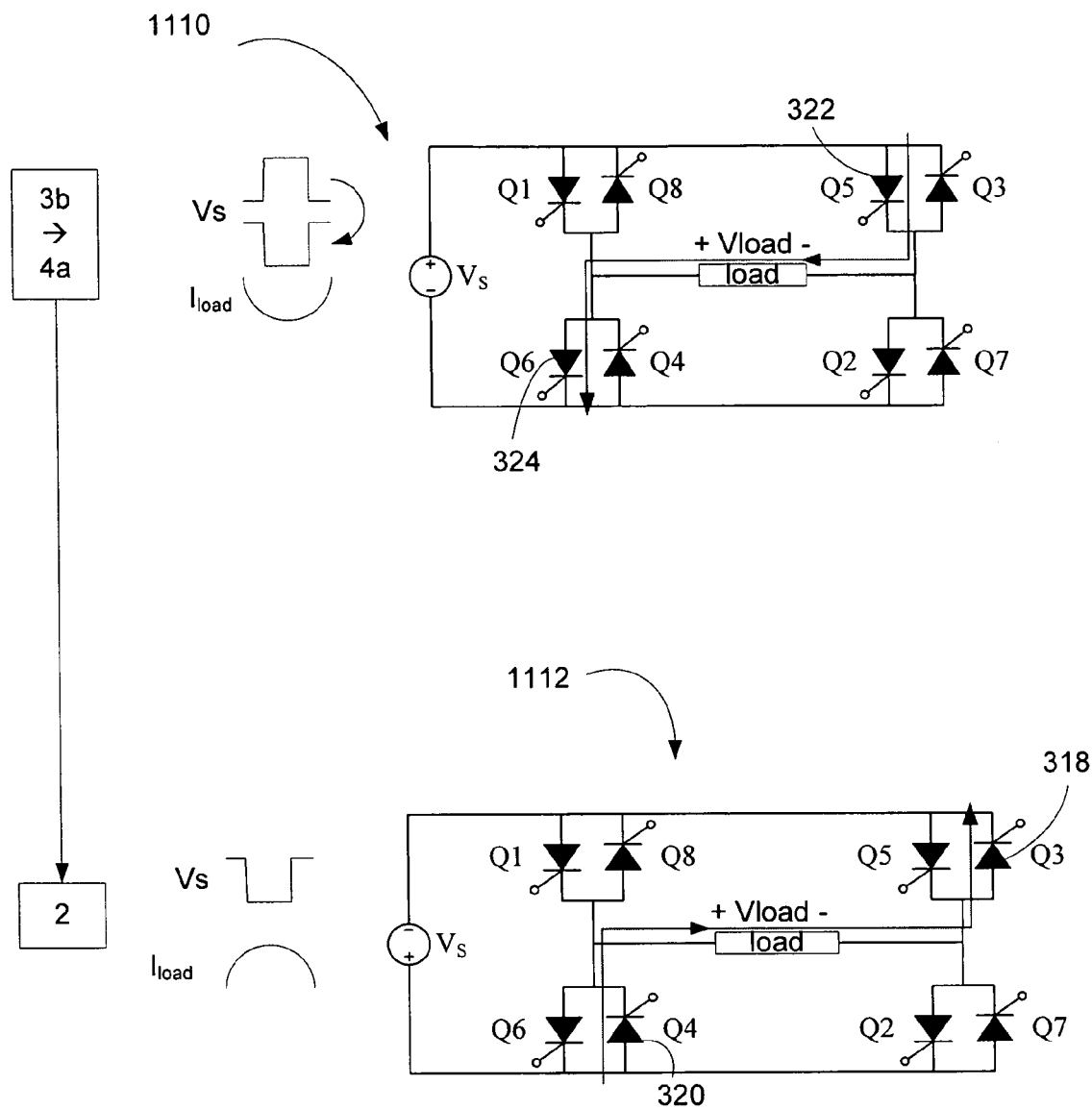
Figure 11:
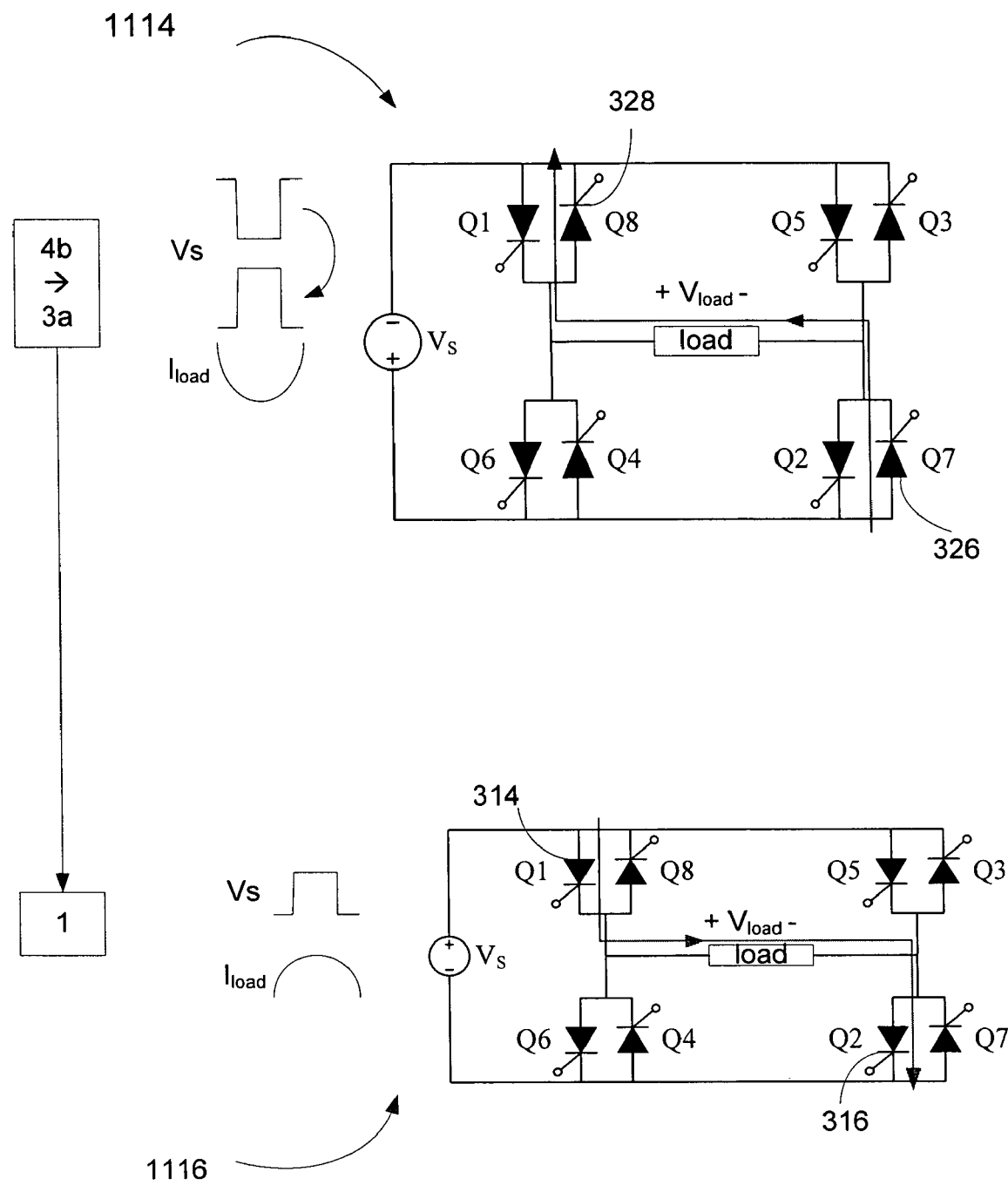

Now referring to FIG. 11a, the source voltage $V_S$ commutates from positive to negative polarity while the load current is positive. The gate signal is suppressed to the outgoing converter and load current $I_{load}$ decreases toward zero, freewheeling via the outgoing converter (last gated switch pair) (Q1, Q2) 314, 316, as shown in diagram 1102. When the decreasing current crosses the $I_P$ threshold, gate pulses are enabled to the incoming converter. The outgoing converter (Q1, Q2) 314, 316 continues to conduct until $I_{load}$ reverses polarity. At the current load zero-cross, the incoming converter switch pair (Q7, Q8) 326, 328 automatically turns-on due to the characteristics of the thyristor, and imposes the negative source voltage $V_S$ across load 312 in a positive direction, resulting in an increase in the magnitude of the load current $I_{load}$, in the negative polarity as shown in diagram 1104.

Now referring to FIG. 11b, the source voltage $V_S$ commutates from negative to positive polarity while the load current is positive. The gate signal is suppressed to the outgoing converter and load current $I_{load}$ decreases toward zero, freewheeling via the outgoing converter (last gated switch pair) (Q3, Q4) 318, 320, as shown in diagram 1106. When the decreasing current crosses the $I_P$ threshold, gate pulses are enabled to the incoming converter. The outgoing converter (Q3, Q4) 318, 320 continues to conduct until $I_{load}$ reverses polarity. At the load current zero-cross, the incoming converter switch pair (Q5, Q6) 322, 324 automatically turns-on due to the characteristics of the thyristor, and imposes the positive source voltage $V_S$ across load 12 in a negative direction, resulting in an increase in the magnitude of the load current $I_{load}$, in the negative polarity as shown in diagram 1108.

Now referring to FIG. 11c, the source voltage $V_S$ commutates from positive to negative polarity while the load current is negative. The gate signal is suppressed to the outgoing converter and load current $I_{load}$ increases toward zero (becomes less negative), freewheeling via the outgoing converter (last gated switch pair) (Q5, Q6) 322, 324, as shown in diagram 1110. When the increasing current crosses the $I_N$ threshold, gate pulses are enabled to the incoming converter. The outgoing converter (Q5, Q6) 322, 324 continues to conduct until $I_{load}$ reverses polarity. At the load current zero-cross, the incoming converter switch pair (Q3, Q4) 318, 320 automatically turns-on due to the characteristics of the thyristor, and imposes the negative source voltage $V_S$ across load 312 in a negative direction, resulting in an increase in the magnitude of the load current $I_{load}$, in the positive polarity as shown in diagram 1112.

Now referring to FIG. 11d, the source voltage $V_S$ commutates from negative to positive polarity while the load current is negative. The gate signal is suppressed to the outgoing converter and load current $I_{load}$ increases toward zero (becomes less negative), freewheeling via the outgoing converter (last gated switch pair) (Q7, Q8) 326, 328, as shown in diagram 1114. When the increasing current crosses the $I_N$ threshold, gate pulses are enabled to the incoming converter. The outgoing converter (Q7, Q8) 326, 328 continues to conduct until $I_{load}$ reverses polarity. At the current load zero-cross, the incoming converter switch pair (Q1, Q2) 314, 316 automatically turns-on due to the characteristics of the thyristor, and imposes the positive source voltage $V_S$ across load 312 in a positive direction, resulting in an increase in the magnitude of the load current $I_{load}$, in the positive polarity as shown in diagram 1116.

Figure 12:
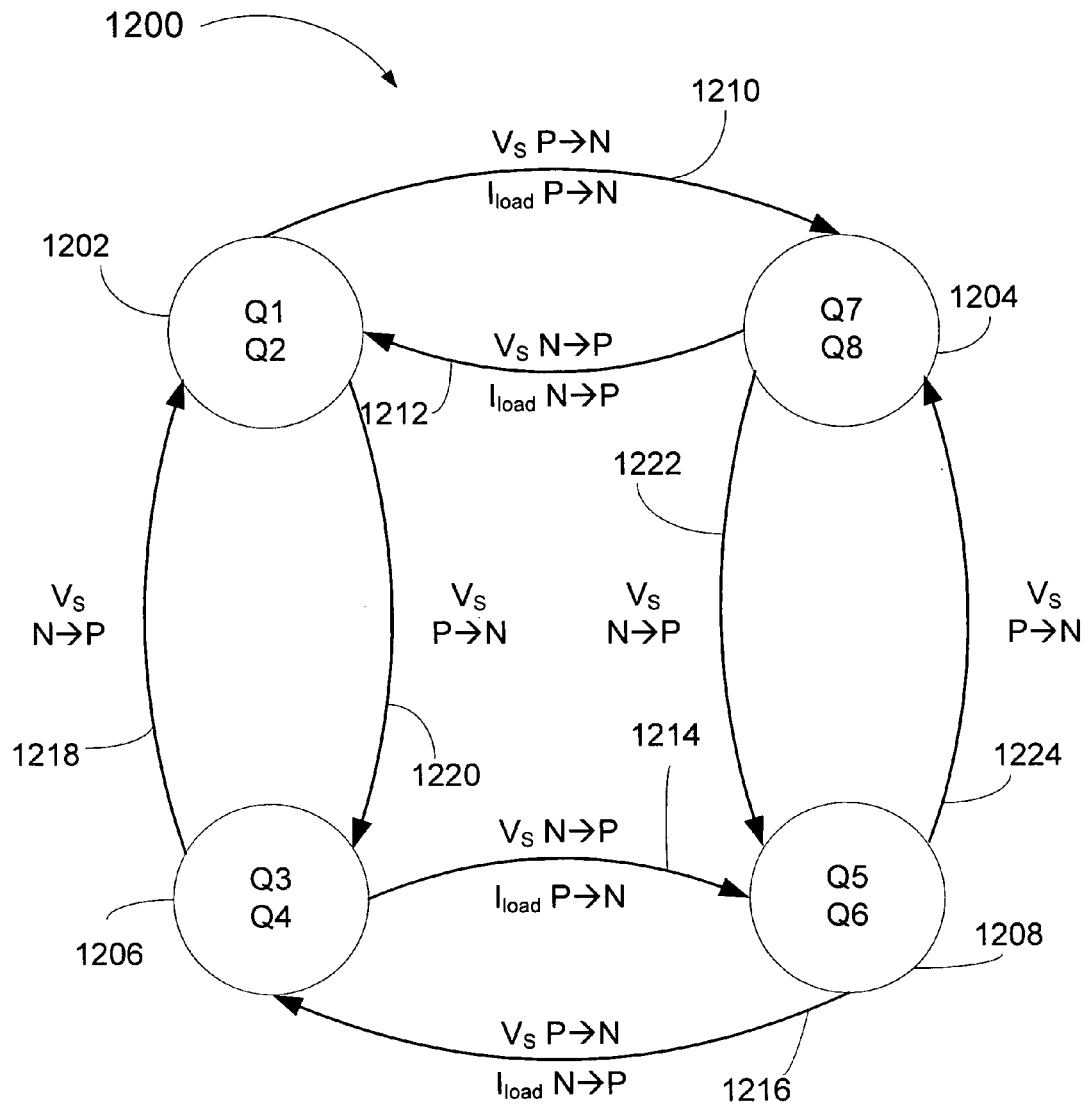
FIG. 12 is a diagram illustrating output bridge state transition of a state-machine control of an SCR based cycloconverter.

In FIG. 12, an output bridge state transition diagram of a state-machine control 1200 for the cycloconverter 300 is shown. The proposed switching technique between state transitions is implemented via state-machine control. Four states 1202, 1204, 1206 and 1208 are shown, with each one representing the currently conducting unidirectional switch pair. Input signals to the eight state transitions are the polarity of the source voltage $V_S$, the $I_P$ 902 and $I_N$ 904 load current polarity signals. A new switch pair is enabled for every change in polarity of the source voltage $V_S$, thus the source voltage polarity is a clock of the cycloconverter state machine.

State transitions 1210, 1212 between (Q1, Q2) machine state 1202 and (Q7, Q8) machine state 1204 are accomplished with polarity switches for both the source voltage $V_S$ and the load current $I_{load}$, and similarly for state transitions 1214, 1216 between (Q3, Q4) machine state 1206 and (Q5, Q6) machine state 1208. These 4 state transitions 1210, 1212, 1214, and 1216, which occur at a frequency of the desired load current $I_{load}$ and referred to as horizontal transitions, reflect load current zero-cross commutations.

State transitions 1218, 1220 between (Q1, Q2) machine state 1202 and (Q3, Q4) machine state 1206 are accomplished with polarity switches for the source voltage $V_S$ while the load current $I_{load}$ is greater than the $I_P$ 902 current threshold. Similarly, state transitions 1222, 1224 between (Q5, Q6) machine state 1208 and (Q7, Q8) machine state 1204 are accomplished with polarity switches for the source voltage $V_S$ while the load current $I_{load}$ is less than the $I_N$ 904 current threshold. These 4 state transitions 1218, 1220, 1222, and 1224, occur at the frequency of the source voltage $V_S$ and all referred to as vertical transitions, where a delay (DE) PWM signal is used to gate the switching elements for positive load current $I_{load}$, and an advance (AD) PWM signal is used to gate the switching elements for negative load current $I_{load}$. The delay PWM signal obtained from a multi-carrier PWM process or equivalent is used for positive load current. The advance PWM signal obtained from the multi-carrier PWM process or equivalent is used for the negative load current. Other suitable signals for positive and negative load current can be generated by other processes.

Commutation failures are prevented by only allowing the above discussed horizontal state transitions 1210, 1212, 1214, and 1216, and vertical state transitions 1218, 1220, 1222, and 1224. As such, state transitions between switch pair (Q1, Q2) 314, 316 machine state 1202 and switch pair (Q5, Q6) 320, 322 machine state 1208, and between switch pair (Q3, Q4) 318, 320 machine state 1206 and switch pair (Q7, Q8) 326, 328 machine state 1204 are not allowed.

Figure 13:
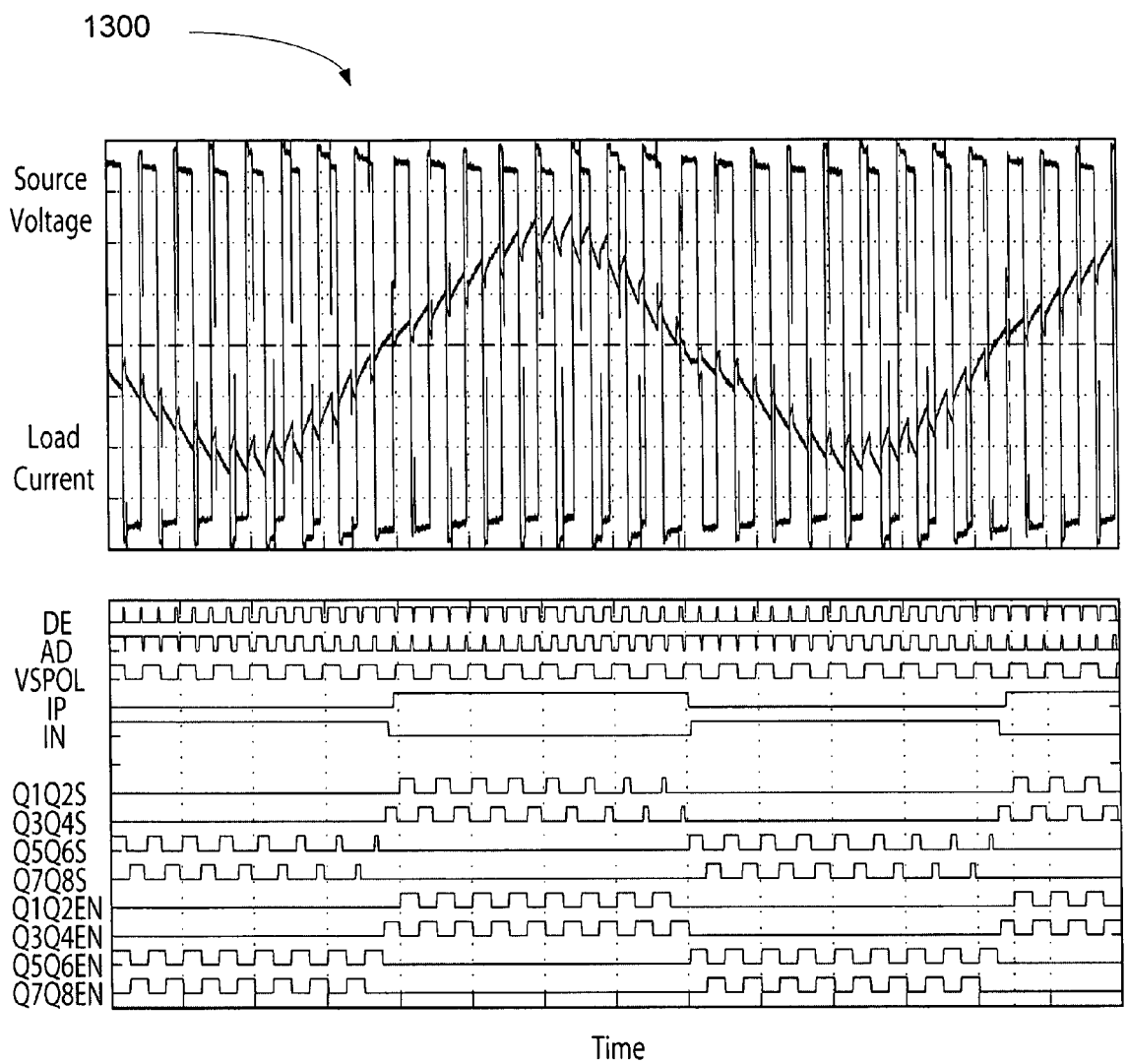
FIG. 13 is a graph illustrating waveforms and logic signals of the output bridge of the cycloconverter.

Now referring to FIG. 13, a graph 1300 illustrating waveforms and logic signals of the output bridge of the cycloconverter is shown. Signals Q1Q2EN, Q3Q4EN, Q5Q6EN, and Q7Q8EN represent the current state of the state-machine as determined by the signals VSPOL representing the polarity of the source voltage $V_S$ and $I_N$ and $I_P$ as previously discussed. Output signals Q1Q2S, Q3Q4S, Q5Q6S, and Q7Q8S are created by steering the AD and delay DE signal pulses to the current switch pair enabled by the state-machine control and trigger multivibrators (not shown). These AD and DE signal pulses are generated by a separate PWM process (not shown) where the AD signal is phase-advanced and the DE signal is phase-delayed relative to the targeted load voltage. The phase relationship of the load voltage to load current is determined by the characteristics of the load. Multivibrators (not shown) convert the Q1Q2S, Q3Q4S, Q5Q6S and Q7Q8S signals into square wave pulses with 50% duty ratio that can be transformer-coupled to the corresponding thyristor switching devices. Alternately, the signals Q1Q2S, Q3Q4S, Q5Q6S and Q7Q8S can be fed to the switching devices via any suitable gate-drive circuitry. Moreover, graphs of Q1Q2S and Q3Q4S output signals reflect that corresponding vertical state transitions relate to positive load current $I_{load}$, as indicated by the $I_N$ and $I_P$ graphs. Similarly, Q5Q6S and Q7Q8S output signals reflect that corresponding vertical state transitions relate to negative load current $I_{load}$, as indicated by the $I_N$ and $I_P$ graphs.

Figure 14:
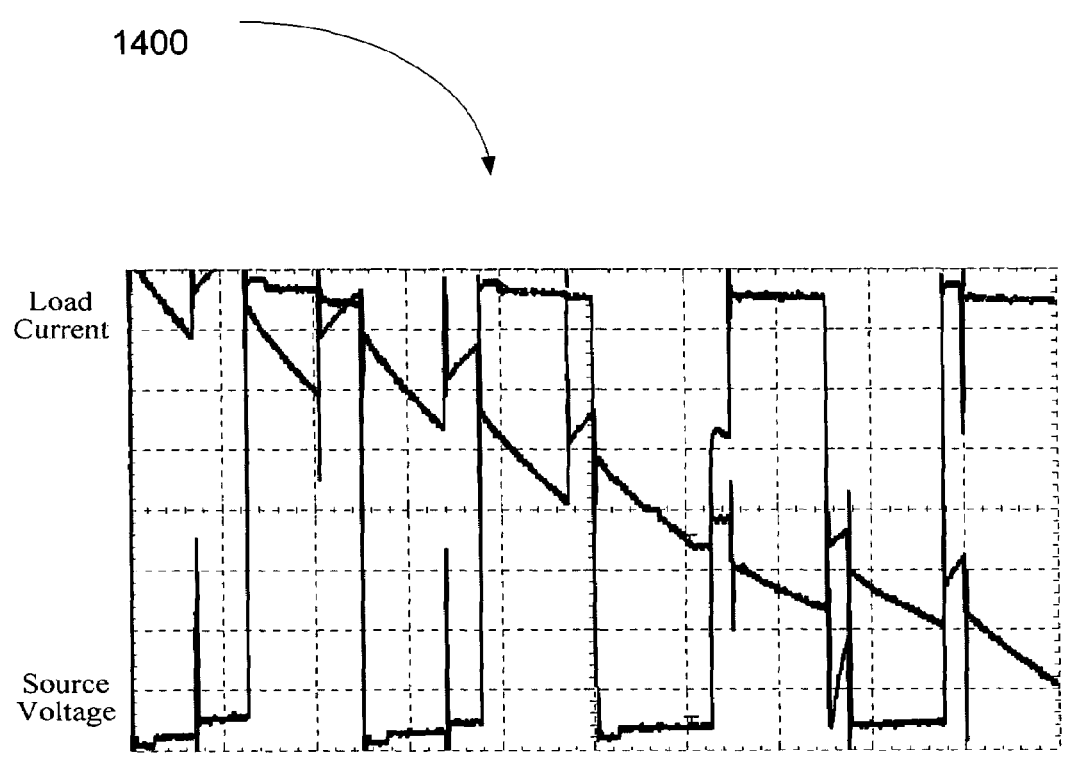
FIG. 14 is a graph illustrating a load current zero-cross in the output bridge of the cycloconverter.

In FIG. 14, a graph 1400 illustrates the load current $I_{load}$ in the output bridge of the cycloconverter (triangular trace) and for source voltage $V_S$ (square trace) in the vicinity of a load current zero cross. Positive load current $I_{load}$ commutates between positive converter 400a and negative converter 400b, as discussed in regard to FIGS. 6a–6d and negative load current commutates between positive converter 400a and negative converter 400b, as discussed in regard to FIGS. 7a–7b. At the moment of the load current zero cross, the minor discontinuity shown is a result of the minimum current (holding current) characteristic inherent in the thyristor technology.

Figure 15:
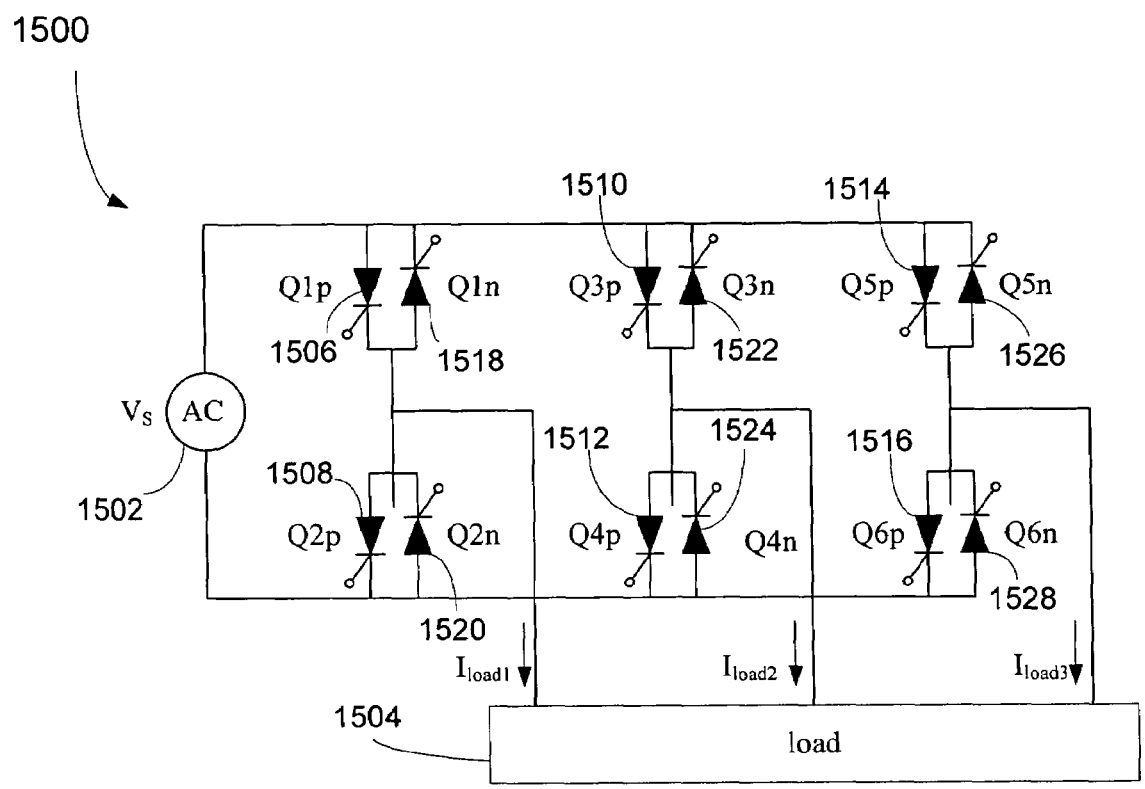
FIG. 15 is a schematic diagram of a three-phase cycloconverter.

Now referring to FIG. 15, a schematic diagram of a three-phase cycloconverter 1500 is shown. Cycloconverter 1500 includes a source 1502 that provides an oscillating source voltage $V_S$ to a three-phase load 1504 and to twelve unidirectional conducting switches Q1p–Q6p 1506–1516, and Q1n–Q6n 1518–1528. Thus, a three-phase output bridge cycloconverter 1500 includes twelve unidirectional switches Q1p–Q6p 1506–1516, and Q1n–Q6n 1518–1528 arranged in six pairs of separately controlled anti-parallel switches.

As such, three single-phase load currents $I_{load1}$, $I_{load2}$ and $I_{load3}$ are commuted via a corresponding combination of four pairs of switches, say for example Q1p–Q4p 1506–1512 and Q1n–Q4n 1518–1524 for $I_{load1}$. Thus, switches Q1p–Q4p 1506–1512 and Q1n–Q4n 1518–1524 are gated on (commanded to turn on) in pairs to establish and maintain a continuous current path for $I_{load1}$. Switches of the bidirectional bridge cycloconverter 1500 are conventionally separated into two converter groups based on a polarity of the source voltage $V_S$. As such, a positive converter comprises switch pairs (Q1p, Q4p) 1506, 1512 and (Q3p, Q2p) 1510, 1508, and a negative converter comprises switch pairs (Q1n, Q4n) 1518, 1524 and (Q3n, Q2n) 1520, 1522. The commutation of load current $I_{load1}$, $I_{load2}$ and $I_{load3}$ is affected, as discussed above, in regard to load current $I_{load}$ for single phase cycloconverter 300. This discussion of the commutation of load current $I_{load1}$, $I_{load2}$ and $I_{load3}$ may reflect an example of balanced load configuration, such as a wye (Y) or, delta (Δ) configuration. However, the proposed technique for controlling a cycloconverter can be applied to a variety of multiphase loads, balanced or unbalanced.

This proposed technique for controlling a cycloconverter prevents commutation failure without using additional components that lower the energy conversion efficiency or switching dead-time that introduces zero-cross distortion. By identifying the proper sequence of switching in the output bridge, load current is allowed to change polarity (zero-cross) naturally as determined by the load characteristics. As stated above, although the proposed technique is presented within the context of the PWM cycloconverter with SCRs as the switching elements, it can be applied to any cycloconverter using any suitable unidirectional switch technology and any suitable modulation scheme.

Alternately, this proposed commutation technique can be utilized in a hard-switched topology. The cycloconverter is soft-switched in that the load current turns off in SCRs when the circuitry allows it. Hard-switched topologies, such as the matrix converter, typically extinguish load current in each switch on command. In matrix converters, the SCRs are replaced by a fully-controlled device such as a metal-oxide semiconductor field-effect transistor (MOSFET) or an insulated gate bipolar transistor (IGBT). Since the hard-switched device can not freewheel the load current like a SCR, the proposed technique is extended to purposely provide the freewheeling path for the load current.

It is therefore intended that the foregoing detailed description be regarded as illustrative rather than limiting, and that it be understood that it is the following claims, including all equivalents, that are intended to define the spirit and scope of this invention.

The invention claimed is:

1. A method for controlling a commutation of a load current, the method comprising:
providing an AC-to-AC converter, the converter comprising a plurality of switching elements and connected to a load;
providing an oscillating voltage to the converter;
determining when a polarity commutation of the oscillating voltage occurs;
preventing a gating of a first set of the plurality of switching elements that impose the oscillating voltage across a load to provide a freewheeling path for the load current;
determining when the load current flowing through the freewheeling path crosses a non-zero current threshold; and
gating on a second set of elements that enables a polarity commutation (zero-cross) of the load current and supports the commutated polarity of the oscillating voltage.

2. The method of claim 1, wherein the plurality of switching elements comprises unidirectional switching elements, the unidirectional switch elements being paired in an anti-parallel configuration at each leg of an output bridge.

3. The method of claim 2, wherein each leg of the output bridge comprises two separately controlled anti-parallel switching elements.

4. The method of claim 2, wherein each leg of the output bridge is configured to conduct bidirectional current and block bidirectional voltage.

5. The method of claim 4, wherein the bidirectional output bridge is configured to be separated in a positive and negative converter based on the polarity of the oscillating voltage.

6. The method of claim 2, wherein the switching elements are gated as pairs to maintain a continuous load current path.

7. The method of claim 1, where the switching elements are thyristors.

8. The method of claim 1, wherein a minimum value of the load current occurs during the freewheeling of the load current for each oscillating voltage commutation.

9. The method of claim 1, further comprising a unique set of switching elements gated on for each commutation of the oscillating voltage polarity.

10. The method of claim 1, wherein a switching from one set of switching elements to another set of switching elements occurs only once per oscillating voltage commutation.

11. The method of claim 1, wherein the threshold current corresponds to preventing an oscillating voltage commutation prior to the load current zero-cross.

12. The method of claim 1, wherein the threshold current is less than a ripple component of the load current, and greater than a holding current of the switching elements.

13. The method of claim 1, wherein the converter is a pulse-width modulated (PWM) cycloconverter.

14. The method of claim 1, wherein the load current has a positive current threshold for a non-negative load current, and the load current has a negative current threshold for a non-positive load current.

15. A method for commutating a multiphase load current, the method comprising:
providing an AC-to-AC converter, the converter comprising a multitude of pairs of anti-parallel unidirectional switching elements configured to provide a bidirectional output bridge for each phase of the load current;
providing an oscillating voltage to the converter; and
for each phase of the load current:
determining when a polarity commutation of the oscillating voltage occurs across the corresponding output bridge;
preventing a gating of a corresponding first set of the multitude of elements that impose the oscillating voltage across the corresponding phase load to provide a freewheeling current path for the load current;
determining when the load current flowing through the freewheeling current path crosses a non-zero current threshold; and
gating on a corresponding second set of switching elements that enables a polarity commutation (zero-cross) of the load current and supports the commutated polarity of the oscillating voltage.

16. The method of claim 15, wherein each of the multitude of pairs of anti-parallel unidirectional switching elements comprises separately controlled switching elements.

17. The method of claim 15, wherein each leg of each phase output bridge is configured to conduct bidirectional current and block bidirectional voltage.

18. The method of claim 15, wherein the multiphase load current is a three phase load current.

* * * * *

UNITED STATES PATENT AND TRADEMARK OFFICE
CERTIFICATE OF CORRECTION

PATENT NO. : 7,187,149 B1  
APPLICATION NO. : 11/202597  
DATED : March 6, 2007  
INVENTOR(S) : Robert S. Balog, Jr. et al.

It is certified that error appears in the above-identified patent and that said Letters Patent is hereby corrected as shown below:

On Title Page Item -54- and Column 1, lines 1-3 should read,

Commutation Technique for an AC-to-AC Converter

Signed and Sealed this

Eighth Day of May, 2007

JON W. DUDAS  
*Director of the United States Patent and Trademark Office*